(12) United States Patent
Kurihara et al.

(10) Patent No.: US 11,937,009 B2
(45) Date of Patent: Mar. 19, 2024

(54) INFRARED IMAGING DEVICE AND NON-TRANSITORY COMPUTER-READABLE STORAGE MEDIUM

(71) Applicant: Mitsubishi Electric Corporation, Tokyo (JP)

(72) Inventors: Kohei Kurihara, Tokyo (JP); Koichi Yamashita, Tokyo (JP); Daisuke Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 258 days.

(21) Appl. No.: 17/424,894

(22) PCT Filed: Feb. 7, 2019

(86) PCT No.: PCT/JP2019/004452
§ 371 (c)(1),
(2) Date: Jul. 22, 2021

(87) PCT Pub. No.: WO2020/161867
PCT Pub. Date: Aug. 13, 2020

(65) Prior Publication Data
US 2022/0094860 A1 Mar. 24, 2022

(51) Int. Cl.
*H04N 5/33* (2023.01)
*H04N 25/60* (2023.01)

(52) U.S. Cl.
CPC ............... *H04N 5/33* (2013.01); *H04N 25/60* (2023.01)

(58) Field of Classification Search
None
See application file for complete search history.

(56) References Cited

U.S. PATENT DOCUMENTS

2004/0239782 A1  12/2004  Equitz et al.
2006/0067569 A1   3/2006  Haga
(Continued)

FOREIGN PATENT DOCUMENTS

GB       2305799 A    4/1997
JP   2009-105966 A    5/2009
(Continued)

OTHER PUBLICATIONS

International Search Report and Written Opinion dated Mar. 19, 2019, received for PCT Application PCT/JP2019/004452, Filed on Feb. 7, 2019, 6 pages including English Translation.
(Continued)

*Primary Examiner* — Eileen M Adams
(74) *Attorney, Agent, or Firm* — XSENSUS LLP

(57) ABSTRACT

Provided is an infrared imaging device capable of reducing streak noise by calculating correction coefficients for correcting streak noise from a single image.
The infrared imaging device includes: a thermal image generator to generate a single thermal image on the basis of a signal from a thermal image sensor; a correction coefficient calculator to calculate multiple correction coefficients included in a correction equation for converting pixel values of pixels included in the single thermal image into target values in which streak noise is reduced; and a thermal image corrector to correct a thermal image generated by the thermal image generator by using the multiple correction coefficients, wherein the correction coefficient calculator calculates the multiple correction coefficients on the basis of difference between pixel values of pixels arranged in a direction in which the streak noise occurs in the single thermal image.

14 Claims, 14 Drawing Sheets

(56) References Cited

U.S. PATENT DOCUMENTS

2010/0302415 A1    12/2010  Egawa
2012/0308104 A1*   12/2012  Yang ...................... G06T 5/002
                                                      382/131
2019/0387185 A1*   12/2019  Hicks .................. G06V 10/143

FOREIGN PATENT DOCUMENTS

JP    2015-81921 A    4/2015
JP    2015-122616 A   7/2015

OTHER PUBLICATIONS

Extended European search report dated Jan. 21, 2022, in corresponding European patent Application No. 19914457.7, 10 pages.

* cited by examiner

THERMAL IMAGE

SMOOTHED THERMAL IMAGE

INFRARED IMAGING DEVICE AND NON-TRANSITORY COMPUTER-READABLE STORAGE MEDIUM

CROSS-REFERENCE TO RELATED APPLICATION

The present application is based on PCT filing PCT/JP2019/004452, filed Feb. 7, 2019, the entire contents of which are incorporated herein by reference.

TECHNICAL FIELD

The present invention relates to an infrared imaging device and an infrared imaging program for performing a noise reduction process on a thermal image.

BACKGROUND ART

There is an infrared imaging device that receives infrared light and generates a thermal image. The infrared imaging device includes multiple infrared detection elements for receiving infrared light, and the infrared detection elements are arranged in a matrix to correspond to the generated image.

The infrared detection elements arranged in a matrix are connected to a separate drive line for each row or column in which elements are arranged, and supplied with electric power through each drive line. When the drive lines vary in characteristics, the relationship between an input value to the infrared detection element and an output value from the infrared detection element varies between the rows or columns, and when a thermal image is generated, streak noise extending in the row direction or column direction may occur in the thermal image.

To reduce such streak noise, Patent Literature 1 proposes correcting streak noise by using correction coefficients. The correction coefficients are calculated by using an image in a light-shielding state and an image in an exposure state.

CITATION LIST

Patent Literature

Patent Literature 1: Japanese Patent Application Publication No. 2009-105966

SUMMARY OF INVENTION

Technical Problem

The above imaging device of Patent Literature 1 needs to capture two images in the light-shielding state and exposure state to calculate the two correction coefficients, and takes time to calculate the correction coefficients. Thus, when the correction coefficients are recalculated to address a change in intensity of the streak noise with time, they cannot be quickly calculated. As a result, there is a problem in that the streak noise cannot be sufficiently reduced until completion of the calculation of the correction coefficients.

The present invention has been made to solve the problem as described above, and is intended to provide an infrared imaging device and an infrared imaging program capable of calculating, from a single image, correction coefficients for correcting streak noise and accurately reducing streak noise by using the calculated correction coefficients.

Solution to Problem

An infrared imaging device according to the present invention includes: a thermal image sensor to receive infrared light and output a signal corresponding to the infrared light; a thermal image generator to generate a single thermal image on a basis of the signal from the thermal image sensor; a correction coefficient calculator to calculate a plurality of correction coefficients included in a correction equation for converting pixel values of pixels included in the single thermal image into target values in which streak noise extending from one end to another end of the single thermal image is reduced; and a thermal image corrector to correct a thermal image generated by the thermal image generator by using the plurality of correction coefficients, wherein the correction coefficient calculator calculates the plurality of correction coefficients on a basis of difference between pixel values of pixels arranged in a direction in which the streak noise occurs in the single thermal image.

Also, an infrared imaging program according to the present invention is for causing a computing device to function as: a thermal image generator to generate a single thermal image on a basis of a signal output from a thermal image sensor; a correction coefficient calculator to calculate a plurality of correction coefficients included in a correction equation for converting pixel values of pixels included in the single thermal image into target values in which streak noise extending from one end to another end of the single thermal image is reduced; and a thermal image corrector to correct an image generated by the thermal image generator by using the plurality of correction coefficients, wherein the infrared imaging program is for causing the computing device to function to cause the correction coefficient calculator to calculate the plurality of correction coefficients on a basis of difference between pixel values of pixels arranged in a direction in which the streak noise occurs in the single thermal image.

Advantageous Effects of Invention

The infrared imaging device and infrared imaging program according to the present invention calculates multiple correction coefficients on the basis of difference between pixel values of pixels included in a single image. Thus, it is possible to calculate the multiple correction coefficients without preparing multiple images, and accurately reduce streak noise by using the calculated correction coefficients.

DESCRIPTION OF EMBODIMENTS

Figure 1:
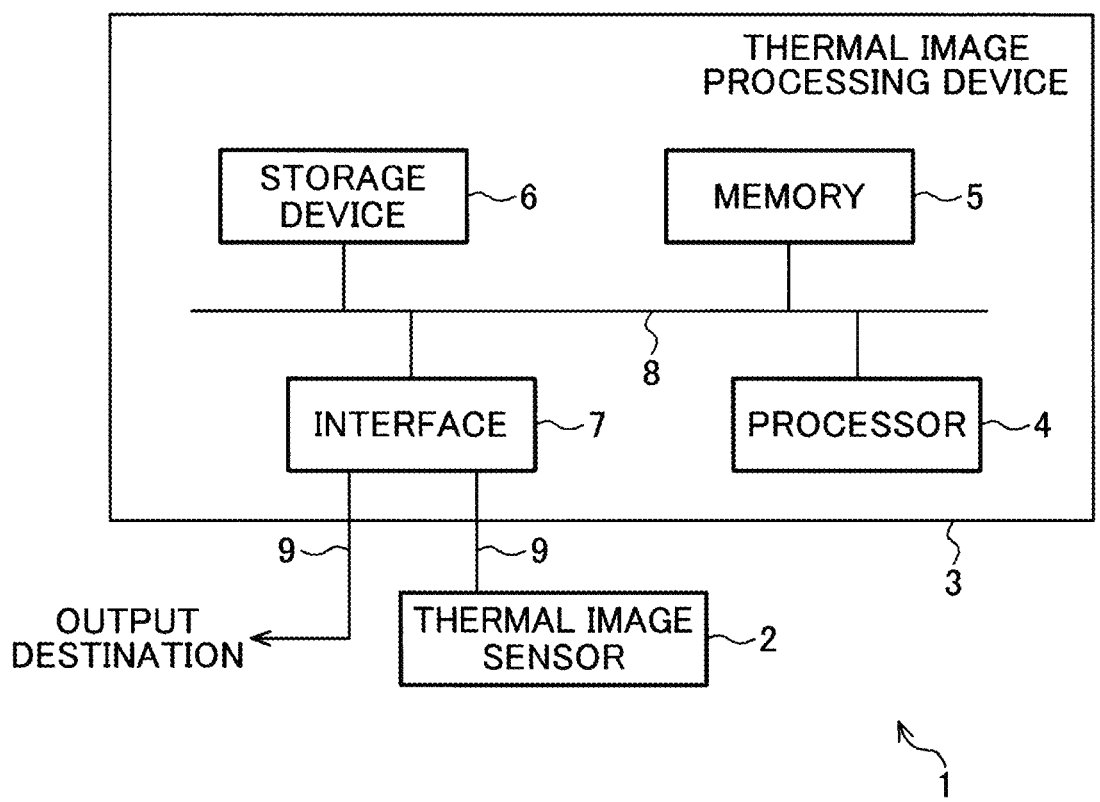
FIG. 1 is a block diagram illustrating a configuration of an infrared imaging device according to a first embodiment of the present invention.

Embodiments of the present invention will be described below with reference to the drawings. Identical reference characters in the drawings indicate identical or corresponding parts.

First Embodiment

A configuration of an infrared imaging device 1 according to a first embodiment of the present invention will be described with reference to FIGS. 1, 2, and 3.

Figure 2:
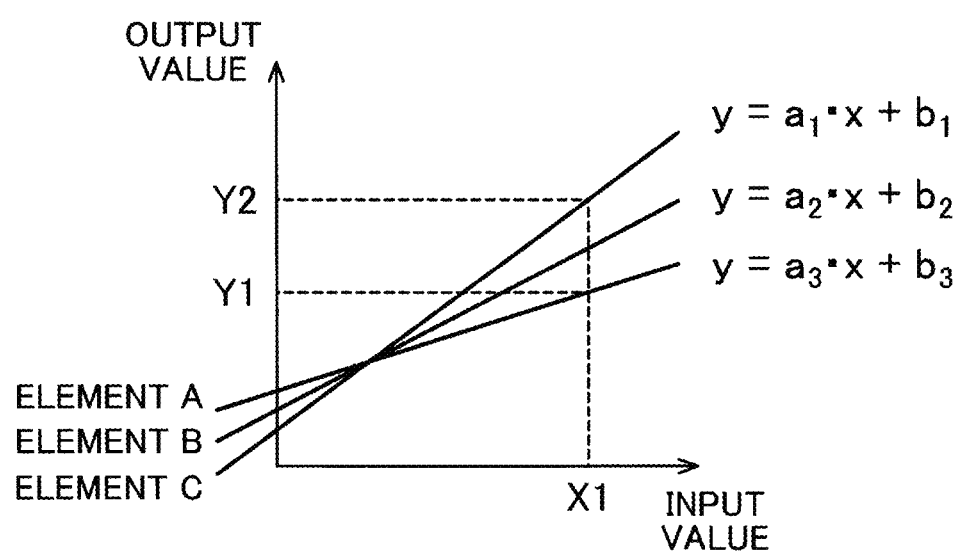
FIG. 2 is a graph illustrating relationships between input values and output values of a thermal image sensor according to the first embodiment of the present invention.

As illustrated in FIG. 1, the infrared imaging device 1 includes a thermal image sensor 2 and a thermal image processing device 3.

The thermal image sensor 2 is provided in an electric product installed in a room, and receives infrared light (electromagnetic waves of about 8 μm to 12 μm) emitted from objects located in the room to output a signal corresponding to the intensity of the infrared light. The thermal image sensor 2 is formed by multiple infrared detection elements that each detect infrared light emitted from objects to output a voltage signal corresponding to the intensity of the infrared light. Examples of the infrared detection elements include pyroelectric elements.

The multiple infrared detection elements are arranged in a matrix, and elements arranged in a row direction are connected to a single drive line and supplied with electric power.

The thermal image sensor 2 is connected to the thermal image processing device 3 via a communication line 9 and transmits the voltage signals output by the elements to the thermal image processing device 3.

The infrared detection elements described here each have a relationship between an input value (infrared light intensity) to the infrared detection element and an output value (a pixel value of a thermal image) from the infrared detection element, and the relationships of the respective infrared detection elements vary due to manufacturing errors or the usage environment. As illustrated in FIG. 2, the relationship between the input value and the output value of each infrared detection element can be approximated and represented by a linear function $y=ax+b$ (where y is the output value, x is the input value, and a and b are coefficients), and the coefficient a or b varies between the elements. For example, when an input of X1 is input to infrared detection element A, the output thereof is Y1, and when an input of X1 is input to infrared detection element C, the output thereof is Y2 (Y2>Y1), and the output value to the input value X1 of infrared detection element C is greater than that of infrared detection element A.

Also, as described above, infrared detection elements arranged in the row direction are connected to the same drive line and supplied with electric power. Thus, the coefficients a indicating sensitivities of the infrared detection elements arranged in the row direction are affected by characteristics of the drive line, and all the infrared detection elements arranged in the row direction may have greater slopes and higher sensitivities or have smaller slopes and lower sensitivities than the other infrared detection elements (that is, the coefficients a of the infrared detection elements arranged in the row direction are uniformly increased or decreased). The coefficients b, which are intercept components, may also vary, and in these cases, the output values of all the infrared detection elements arranged in the row direction are shifted. In this case, streak-shaped noise (referred to below as streak noise) extending in the row direction from one end to another end of the thermal image occurs in the thermal image.

Moreover, as the thermal image sensor continues to be used, the coefficients a indicating the sensitivities of the infrared detection elements arranged in the row direction or the coefficients b that are the intercept components vary due to, for example, variation in characteristics of the drive line, and thus the intensity of the streak noise is not constant but varies with time.

The thermal image processing device 3 receives the voltage signals from the above thermal image sensor 2, generates a thermal image, and corrects the streak noise included in the thermal image. The thermal image processing device 3 includes a processor 4, a memory 5, a storage device 6, an interface 7, and a data bus 8, as illustrated in FIG. 1.

The processor 4 reads various programs, such as a program for generating a thermal image on the basis of the voltage signals transmitted from the thermal image sensor 2, a program for correcting pixel values of pixels included in the thermal image by using a correction equation, and a program for calculating correction coefficients included in the correction equation, expands them in the memory 5, and executes the programs.

The memory 5 is a volatile storage medium, such as a random access memory (RAM), and used as an area where the processor 4 expands programs when executing the programs, various caches, and a buffer.

The storage device 6 is a large-capacity non-volatile storage medium, such as a hard disk drive (HDD) or a solid state disk (SSD), and stores the various programs executed by the processor 4 and the like.

The interface 7 receives the voltage signals transmitted from the thermal image sensor 2, and transmits a corrected thermal image in which the streak noise has been corrected by the thermal image processing device 3, to an output destination, such as a display (not illustrated).

The data bus 8 is a transmission path that communicably connects the processor 4, memory 5, storage device 6, and interface 7.

Communication lines 9 are cables that connect the thermal image sensor 2 and the thermal image processing device 3, connect the thermal image processing device 3 and the output destination, such as a display, and transmit the voltage signals and the like.

Figure 3:
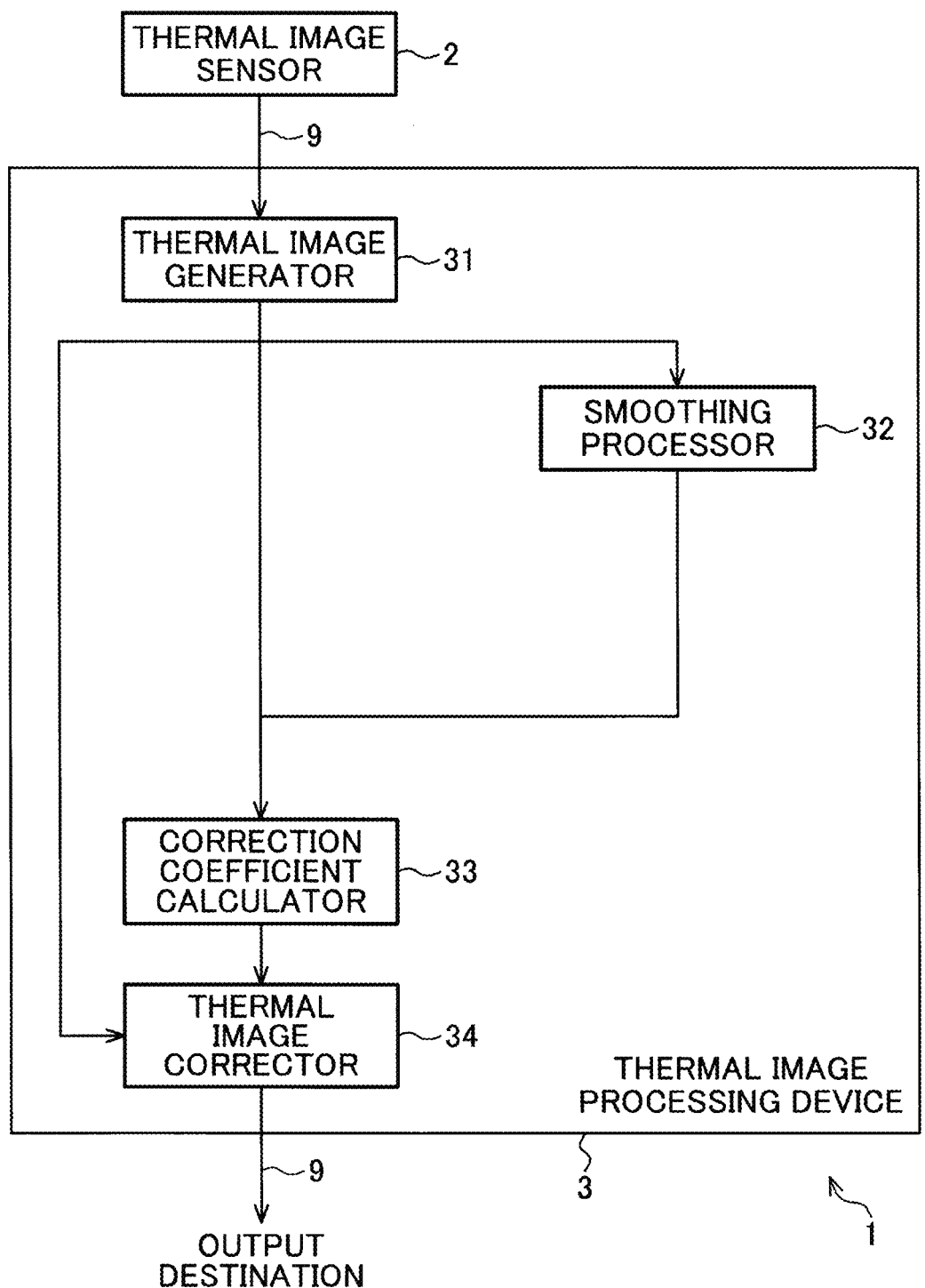
FIG. 3 is a block diagram illustrating the configuration of the infrared imaging device according to the first embodiment of the present invention.

The thermal image processing device 3 includes a thermal image generator 31, a smoothing processor 32, a correction coefficient calculator 33, and a thermal image corrector 34, as illustrated in FIG. 3. The thermal image generator 31, smoothing processor 32, correction coefficient calculator 33, and thermal image corrector 34 are implemented by the processor 4 executing the various programs.

The thermal image generator 31 has a function of converting the voltage signals of the thermal image sensor 2 received via the interface 7 into pixel values and generating a single thermal image including multiple pixels having different pixel values in a direction in which the streak noise occurs.

The smoothing processor 32 has a function of performing, for each of pixel values (target pixel values) of pixels included in a pixel row that is a set of pixels arranged in the direction in which the streak noise occurs in the single thermal image generated by the thermal image generator 31 and that includes multiple pixels having different pixel values, a smoothing process on the pixel value by using pixel value(s) (adjacent pixel value(s)) of adjacent pixel(s) included in pixel row(s) adjacent in a direction crossing the direction in which the streak noise occurs, and calculating, for each pixel, a pixel value after smoothing (a smoothed pixel value) as a target value corresponding to the pixel value before correction of the pixel. The smoothed pixel value is an average value of the target pixel value and the adjacent pixel value(s).

The correction coefficient calculator 33 has a function of calculating two correction coefficients c and d included in a correction equation $z=cy+d$ (where z is a corrected pixel value (target value), y is a pixel value of the thermal image, and c and d are the correction coefficients) for converting target pixel values in a thermal image generated by the thermal image generator 31 into target values in which the streak noise is reduced.

The thermal image corrector 34 has a function of correcting an image generated by the thermal image generator 31 by using the two correction coefficients calculated by the correction coefficient calculator 33.

The target pixel values refer to pixel values included in a particular pixel row when the smoothing process, correction coefficient calculation process, or correction process is performed on the particular pixel row. The adjacent pixel value(s) refer to pixel value(s) included in pixel row(s) adjacent to the particular pixel row. Thus, when the particular pixel row changes with the progress of the process, the pixel values referred to by the target pixel values and adjacent pixel value(s) also change. A pixel value referred to as a target pixel value can become an adjacent pixel value, and the opposite can also occur.

The configuration of the infrared imaging device 1 has been described above. Next, an operation of the infrared imaging device 1 will be described with reference to FIGS. 4, 5, 6A, 6B, and 7A to 7C.

Figure 4:
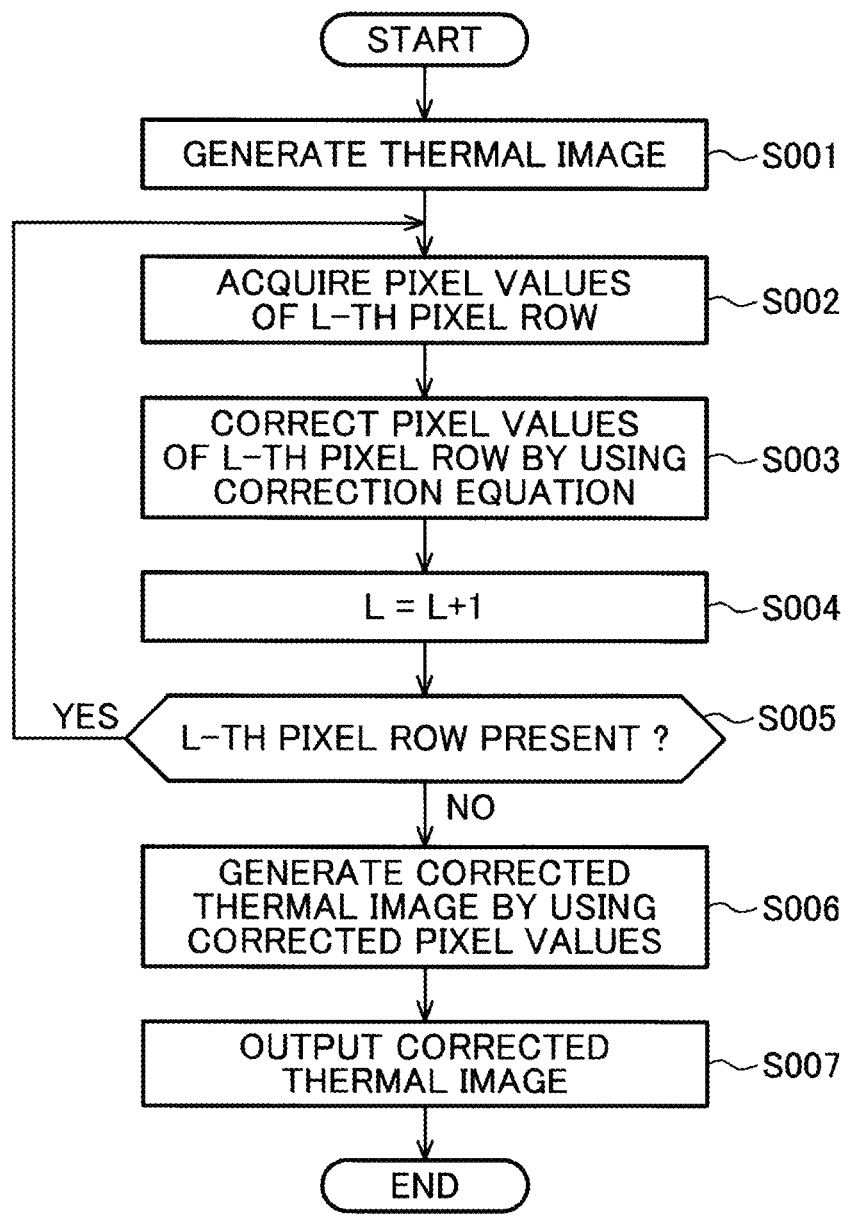
FIG. 4 is a flowchart illustrating a process for outputting a corrected thermal image by the infrared imaging device according to the first embodiment of the present invention.

A process in which the infrared imaging device 1 generates a thermal image, reduces the streak noise included in the thermal image, and outputs an image will be first described in accordance with the flowchart illustrated in FIG. 4. This process is represented by arrows connecting the thermal image sensor 2, thermal image generator 31, thermal image corrector 34, and output destination, in the block diagram of FIG. 3.

The thermal image sensor 2 images the inside of the room and transmits the voltage signals corresponding to the infrared light to the thermal image processing device 3 via the communication line 9, at regular intervals while the electric product is operating. The process of the flowchart of FIG. 4 is started each time the thermal image processing device 3 receives the voltage signals from the thermal image sensor 2.

Here, the thermal image sensor 2 images the inside of the room while the electric product is operating. Since the electric product itself or objects therearound is/are heated by the electric product operating, the thermal image is one obtained by imaging multiple regions having different temperatures in the room in an exposure state, and the thermal image, which is generated on the basis of the voltage signals from the thermal image sensor 2, includes multiple pixels having different pixel values in the direction (row direction) in which the streak noise occurs.

First, the thermal image generator 31 generates a single thermal image from the voltage signals from the thermal image sensor 2 (step S001).

Specifically, the thermal image sensor 2 transmits the voltage signals output from the respective infrared detection elements to the thermal image processing device 3 in accordance with an order associated with the arrangement of the infrared detection elements. The thermal image processing device 3 receives the voltage signals via the interface 7 and stores voltage values of the voltage signals together with information indicating the order associated with the arrangement of the elements, in the memory 5 or storage device 6 (referred to below as memory 5, etc.). The processor 4 of the infrared imaging device 1 reads the voltage values and the order information, converts the voltage values into pixel values previously associated therewith, arranges the pixel values by means of the order information to generate a single thermal image, and stores it in the memory 5, etc.

Then, the thermal image corrector 34 acquires the pixel values of the L-th pixel row in the single thermal image generated by the thermal image generator 31 (step S002). Here, L is a natural number, and L is set to 1 as an initial value when the process of this flowchart is started.

Specifically, the processor 4 reads, from the memory 5, etc., the pixel values arranged in the row direction, with the leftmost pixel of the L-th row (the first row when L is the initial value) of the generated single thermal image as the starting position.

Then, the thermal image corrector 34 corrects each pixel value of the L-th row by using a correction equation corresponding to the L-th row (step S003).

The correction equation is $z=cy+d$, described above, and the correction coefficients c and d vary between the rows. The correction coefficients c and d are calculated by the correction coefficient calculation process to be described later with reference to the flowchart of FIG. 5.

Specifically, the processor 4 reads, from the memory 5, etc., the correction coefficients c and d previously prepared for correcting the L-th row, and substitutes these correction coefficients and the pixel value of the leftmost pixel of the L-th row into the correction equation to obtain z, which is the target value of the leftmost pixel. This value z is a corrected pixel value in which the streak noise is reduced. The processor 4 also processes the pixel values of the second and subsequent pixels in the same manner, and stores, in the memory 5, etc., a pixel value row consisting of the multiple corrected pixel values together with information indicating the row.

Then, the thermal image corrector 34 (processor 4) sets L to L+1 (step S004), determines whether a pixel row is present at the L-th row (where L has been set to L+1) (step S005), and when it is present (YES in step S005), repeats the process of steps S002 to S004.

When no pixel row is present at the L-th row (where L has been set to L+1) (NO in step S005), i.e., when all the pixel rows have been corrected, the thermal image corrector 34 reconstructs an image by using the corrected pixel values and generates a corrected image (step S006).

Specifically, the processor 4 reads, for each pixel row, the corrected pixel values of the pixel row and the information indicating the row, from the memory 5, etc., and rearranges the pixel rows in accordance with the row information to generate a single thermal image.

Finally, the thermal image corrector 34 outputs the corrected thermal image to the output destination (step S007).

Specifically, the processor 4 converts data of the image into a data frame in accordance with a predetermined communication standard, and transmits it to the output destination via the interface 7.

The process of correcting and outputting a thermal image in the infrared imaging device 1 has been described above. Next, a process in which the infrared imaging device 1 calculates the correction coefficients c and d used in correcting a thermal image will be described with reference to the flowchart of FIG. 5. This process is represented by arrows connecting the thermal image sensor 2, thermal image generator 31, correction coefficient calculator 33, and thermal image corrector 34, and arrows connecting the thermal image sensor 2, thermal image generator 31, smoothing processor 32, correction coefficient calculator 33, and thermal image corrector 34, in the block diagram of FIG. 3.

Figure 5:
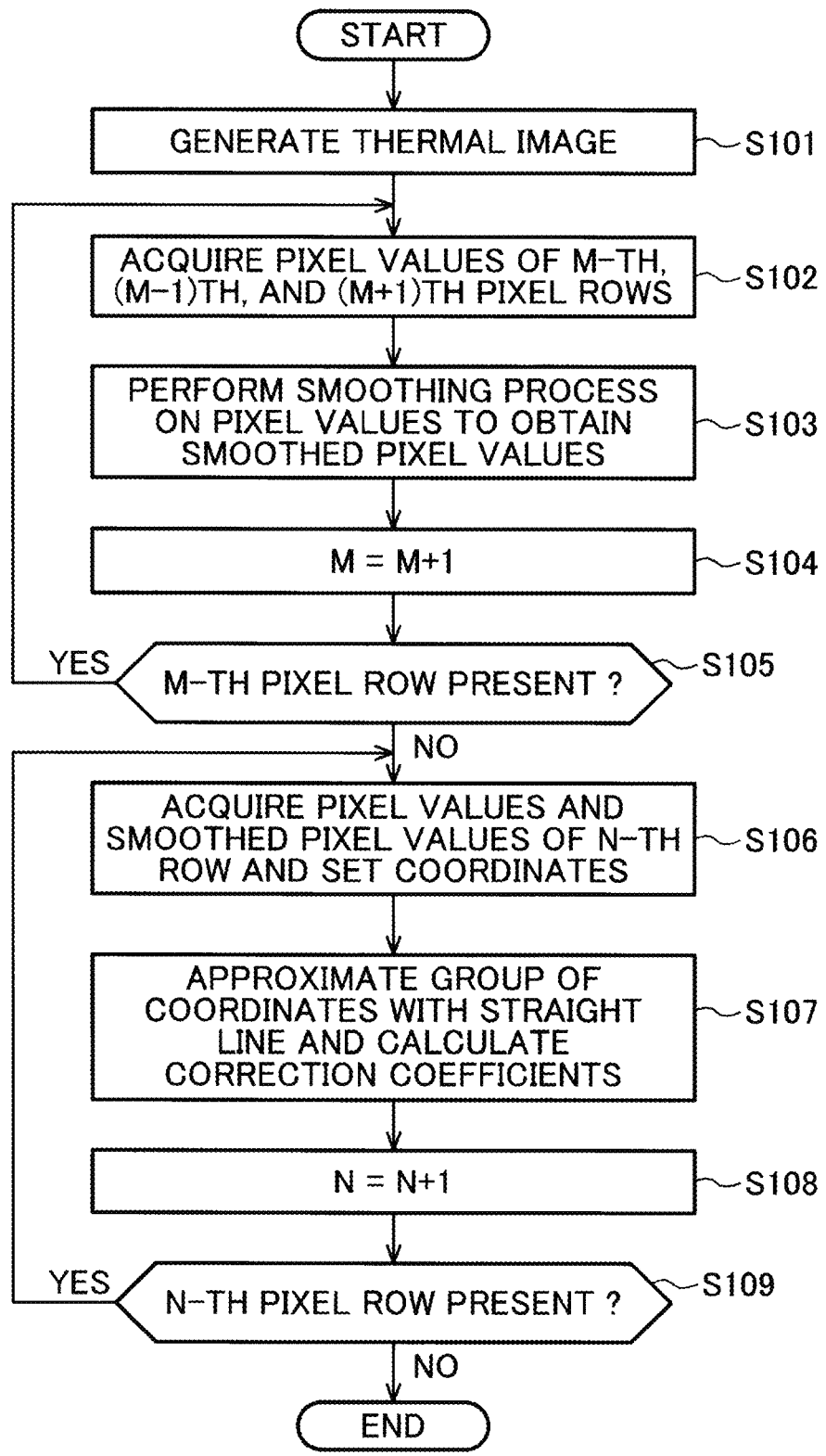
FIG. 5 is a flowchart illustrating a process of calculating correction coefficients by the infrared imaging device according to the first embodiment of the present invention.

The process illustrated by the flowchart of FIG. 5 is started each time a predetermined time elapses after the infrared imaging device 1 starts the process of correcting a thermal image in accordance with the flowchart of FIG. 4.

First, the thermal image generator 31 generates a single thermal image from the voltage signals from the thermal image sensor 2 (step S101). This process is the same as that of step S001 of FIG. 4.

Then, the smoothing processor 32 acquires each pixel value of the M-th, (M−1)th, and (M+1)th pixel rows in the single thermal image generated by the thermal image generator 31 (step S102). Here, M is a nature number, and M is set to 1 as an initial value when the process of this flowchart is started.

Specifically, the processor 4 reads, from the memory 5, the pixel values arranged in the row direction, with the leftmost pixels of the M-th, (M−1)th, and (M+1)th rows of the generated single thermal image as the starting positions.

When M=1, i.e., when the pixel values of the uppermost pixel row of the thermal image is read, since the (M−1)th row is not present, it is assumed that a pixel row that is the same as the M-th or (M+1)th row is present at the (M−1)th row, and the M-th or (M+1)th pixel row that has been separately read is treated as the (M−1)th pixel row. Similarly, for the lowermost row of the thermal image, since the (M+1)th pixel row is not present, the M-th or (M−1)th pixel row that has been separately read is treated as the (M+1)th pixel row.

Here, the pixel values included in the M-th row are target pixel values, and the pixel values included in the (M−1)th and (M+1)th rows are adjacent pixel values.

Then, the smoothing processor 32 smooths each target pixel value of the M-th row by using adjacent pixel values that are pixels of the (M−1)th and (M+1)th rows adjacent to the target pixel, and obtains a smoothed pixel value of each pixel of the M-th row (step S103).

Figure 6A:
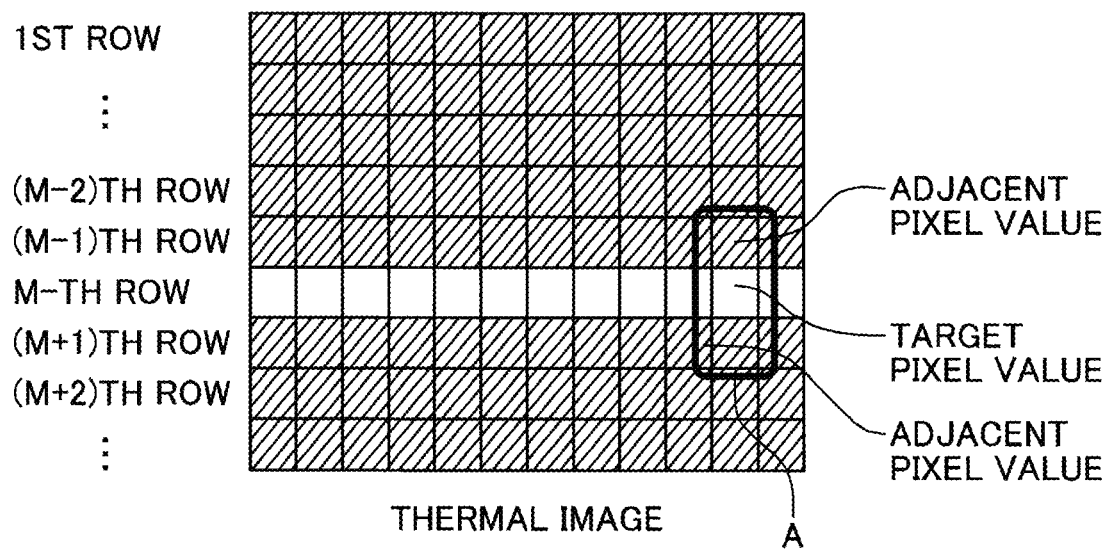
FIGS. 6A and 6B are conceptual diagrams for explaining a smoothing process by the infrared imaging device according to the first embodiment of the present invention.

A specific process by the processor 4 will be described with reference to FIGS. 6A and 6B. For example, when the target pixel values of the M-th row in FIG. 6A are smoothed, the processor 4 determines, for each target pixel value, an average value of the target pixel value and the corresponding two adjacent pixel values (for example, determines an average value within frame A in FIG. 6A). These average values are determined by determining an average value with the leftmost target pixel value of the M-th pixel row and the leftmost adjacent pixel values and determining average values by processing the second and subsequent target pixel values and the adjacent pixel values in the same manner. The determined multiple average values are stored in the memory 5, etc., as smoothed pixel values corresponding to the respective target pixel values, together with information indicating the row and position information of the pixels in the row.

Figure 6B:
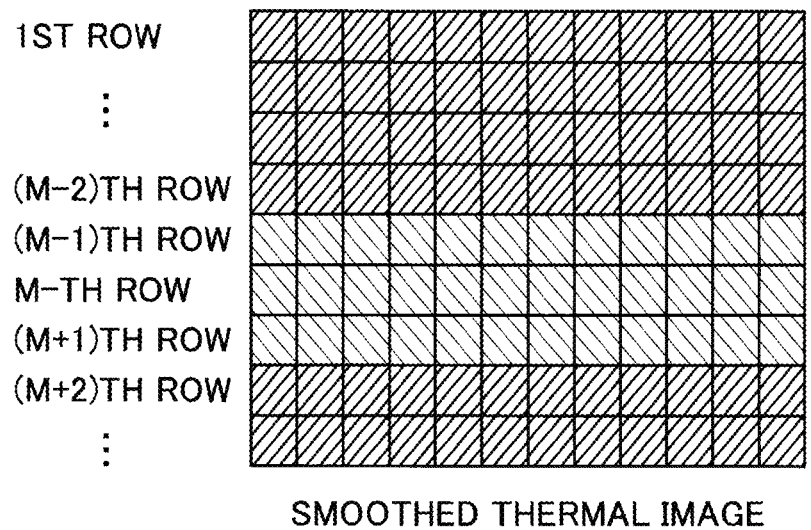

Here, when the smoothing process of determining an average value within frame A in FIG. 6A is performed, a smoothed thermal image consisting of the smoothed pixel values in which the streak noise is reduced is obtained at the M-th row as in FIG. 6B. Since the distribution of infrared light at the M-th row generally correlates with the infrared light distributions at the (M−1)th and (M+1)th rows adjacent thereto, it is possible to consider that a correspondence relationship between the individual target pixel values included in the M-th row and the smoothed pixel values included in the smoothed thermal image is maintained, and it is possible to take the smoothed pixel values in which the streak noise is reduced, as target values z for the target pixel values. The correction coefficients of the correction equation z=cy+d for each row are calculated with the smoothed pixel values as the target values z, in the subsequent process of steps S106 to S109.

Returning to the flowchart of FIG. 5, the smoothing processor 32 (processor 4) sets M to M+1 (step S104), determines whether a pixel row is present at the M-th row (where M has been set to M+1) (step S105), and when it is present (YES in step S105), repeats the process of steps S102 to S104. When it is not present (NO in step S105), the process of calculating the correction coefficients in and after step S106 is started.

Then, the correction coefficient calculator 33 acquires the target pixel values of the N-th row and the smoothed pixel values of the N-th row, and sets multiple coordinates by using the target pixel row and smoothed pixel row corresponding to each other (step S106). Here, N is a natural number, and N is set to 1 as an initial value when the process of this flowchart is started.

Figure 7A:
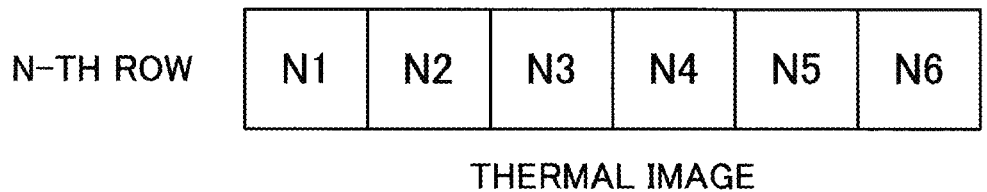
FIGS. 7A to 7C are conceptual diagrams and a graph for explaining the process of calculating the correction coefficients by the infrared imaging device according to the first embodiment of the present invention.
Figure 7B:
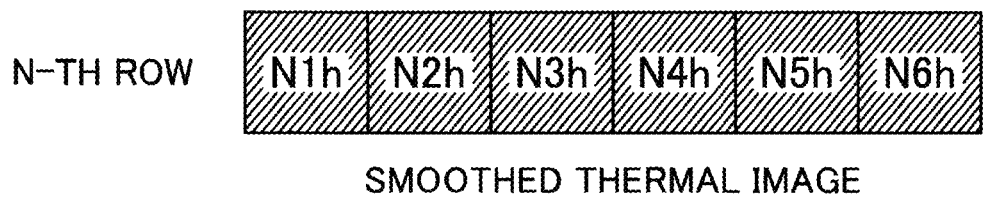
Figure 7C:
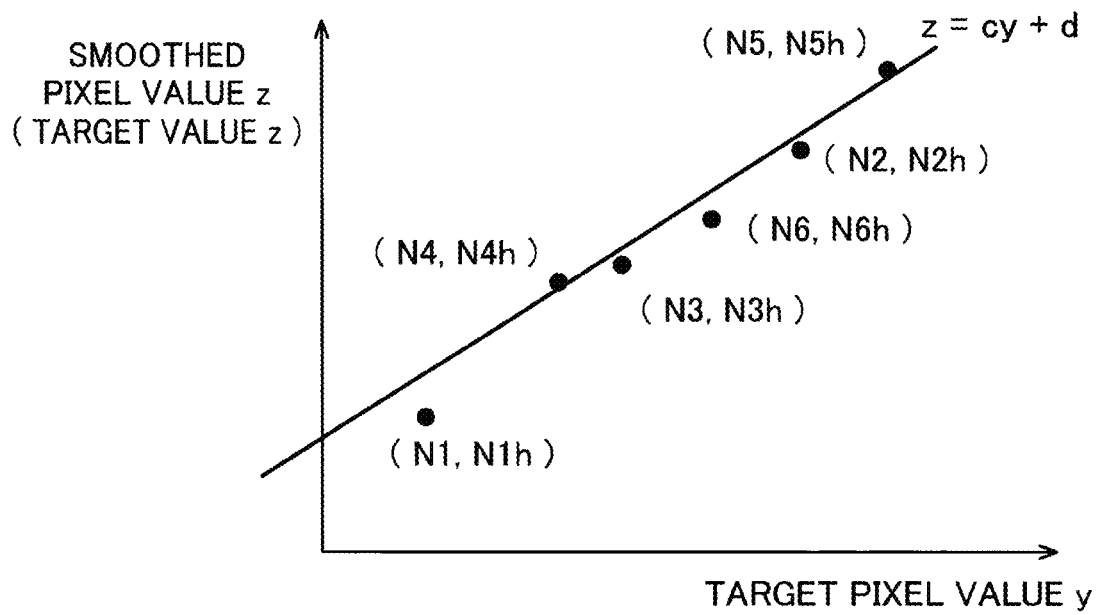

A specific process by the processor 4 will be described with reference to FIGS. 7A to 7C. For example, when coordinates are set from the target pixel values and smoothed pixel values of the N-th row, the processor 4 reads the target pixel values of the N-th pixel row of the thermal image (N1 to N6 in FIG. 7A). Also, the processor 4 reads the smoothed pixel values of the N-th pixel row of the smoothed thermal image (N1$h$ to N6$h$ in FIG. 7B). Then, the processor 4 uses the target pixel values and the corresponding smoothed pixel values to set coordinates (e.g., (N1, N1$h$)) with the target pixel values as y-coordinates and the smoothed pixel values as z-coordinates (step S106).

Then, the correction coefficient calculator 33 plots the group of the set coordinates in a y-z coordinate space, approximates it with a straight line to determine a straight line equation $z=cy+d$, and calculates the correction coefficients c and d (step S107). Here, the multiple coordinates are plotted at different positions. Since the single thermal image includes multiple pixels having different pixel values in the direction (row direction) in which the streak noise occurs, as described above, the plot positions are different. On the basis of this difference between the positions, i.e., the difference between the pixel values, the correction coefficients c and d are calculated.

Specifically, the processor 4 calculates the correction coefficients c and d by using a least-squares method so that distances between the set coordinates and the straight line equation $z=cy+d$ are minimized (FIG. 7C), and stores them in the memory 5, etc. together with information indicating the row.

Then, the correction coefficient calculator 33 (processor 4) sets N to N+1 (step S108), determines whether a pixel row is present at the N-th row (where N has been set to N+1) (step S109), and when it is present (YES in step S109), repeats the process of steps S106 to S108. When it is not present (NO in step S109), since the correction coefficients c and d have been calculated for all the rows of the thermal image, the process ends.

The infrared imaging device 1 according to the first embodiment of the present invention is configured as described above, and provides the following advantages.

The infrared imaging device 1 calculates the multiple correction coefficients on the basis of difference between the pixel values of pixels included in a single thermal image. To determine the multiple correction coefficients, multiple different pixel values are required. For example, when a single thermal image includes only identical pixel values, or when the multiple correction coefficients are determined by using an average value of the pixel values included in a single image, it is necessary to capture multiple thermal images in different temperature conditions. On the other hand, by using the infrared imaging device 1, it is possible to calculate the multiple correction coefficients only from a single thermal image. Thus, it is possible to calculate the multiple correction coefficients without preparing multiple thermal images, and it is possible to accurately reduce the streak noise by using the calculated correction coefficients.

Also, the infrared imaging device 1 determines the multiple correction coefficients and corrects a thermal image by using them. On the other hand, in the case of determining a single correction coefficient and correcting a thermal image, the streak noise cannot be sufficiently reduced. For example, in the case of determining a difference value between a target pixel value and a smoothed pixel value (which is equivalent to determining the coefficient d in $z=y+d$) and correcting a thermal image by using only the difference value, any input value can only be corrected by adding the difference value. However, as illustrated in FIG. 2, the sensitivities (coefficients a) of the infrared detection elements vary, and a is not always equal to 1. When the input value changes, the output value of an element having a sensitivity higher than that of a=1 changes by an amount greater than the amount of the change in the input value. When the output value of such an element is corrected by using only the difference value, the amount of the correction is insufficient. Also, for the output value of an element having a lower sensitivity, the amount of the correction is excessive. The infrared imaging device 1 can accurately reduce the streak noise regardless of variation in the input value, by calculating the multiple correction coefficients (not only the correction coefficient d but also the correction coefficient c).

Also, the infrared imaging device 1 uses, as target values, smoothed pixel values obtained from a single thermal image. When target value(s) are previously prepared, the correction coefficient(s) cannot be determined unless thermal image(s) are captured in temperature condition(s) corresponding to the target value(s). In contrast, the infrared imaging device 1 can calculate the correction coefficients by using a thermal image during an operating time in which the temperature condition is not constant. This makes it possible to update the correction coefficients as needed even after the operation of the infrared imaging device 1 is started.

Also, the infrared imaging device 1 calculates the correction coefficients by setting coordinates by using the target pixel values of a thermal image and the smoothed pixel values (target values) of the smoothed thermal image and approximates the coordinates with a straight line. Thus, it is possible to calculate the correction coefficients merely by setting coordinates and performing a linear approximation process once, and efficiently update the correction coefficients.

Also, the infrared imaging device 1 approximates the coordinates with a straight line to calculate the correction coefficients. When an edge portion of a heat source is located at a row for which the correction coefficients are calculated, the edge portion is smoothed, and the accuracy of the smoothed pixel values as the target values may be decreased. When the target pixel values are corrected with such smoothed pixel values as the target values, an inappropriate thermal image is obtained. However, since the infrared imaging device 1 approximates the multiple coordinates with a straight line, it can reduce the decrease in the correction accuracy due to the edge portion. This is because even when coordinates with smoothed pixel values at the edge portion are included, the percentage of the edge portion to the entire pixels included in the row is small.

Second Embodiment

A second embodiment of the present invention will now be described. For parts that are the same as configurations and operations described in the first embodiment, description will be omitted, and parts different from the first embodiment will be described below.

The first embodiment calculates correction coefficients by setting coordinates by using target pixel values of a thermal image and the smoothed pixel values (target values) of the smoothed thermal image and approximating the coordinates with a straight line.

The second embodiment approximates a sequence obtained by sorting target pixel values of a thermal image in descending or ascending order, with a straight line to determine $y=en+f$ (where y is the target pixel value, n is the ordinal position of the target pixel value, and e and f are coefficients), approximates a sequence obtained by sorting smoothed pixel values (target values) of a smoothed thermal image in descending or ascending order, with a straight line to determine z=gn+h (where z is the smoothed pixel value (target value), n is the ordinal position of the smoothed pixel value, and g and h are coefficients), combines and transforms these equations into a form of z=cy+d, and determines the correction coefficients c and d.

Figure 8:
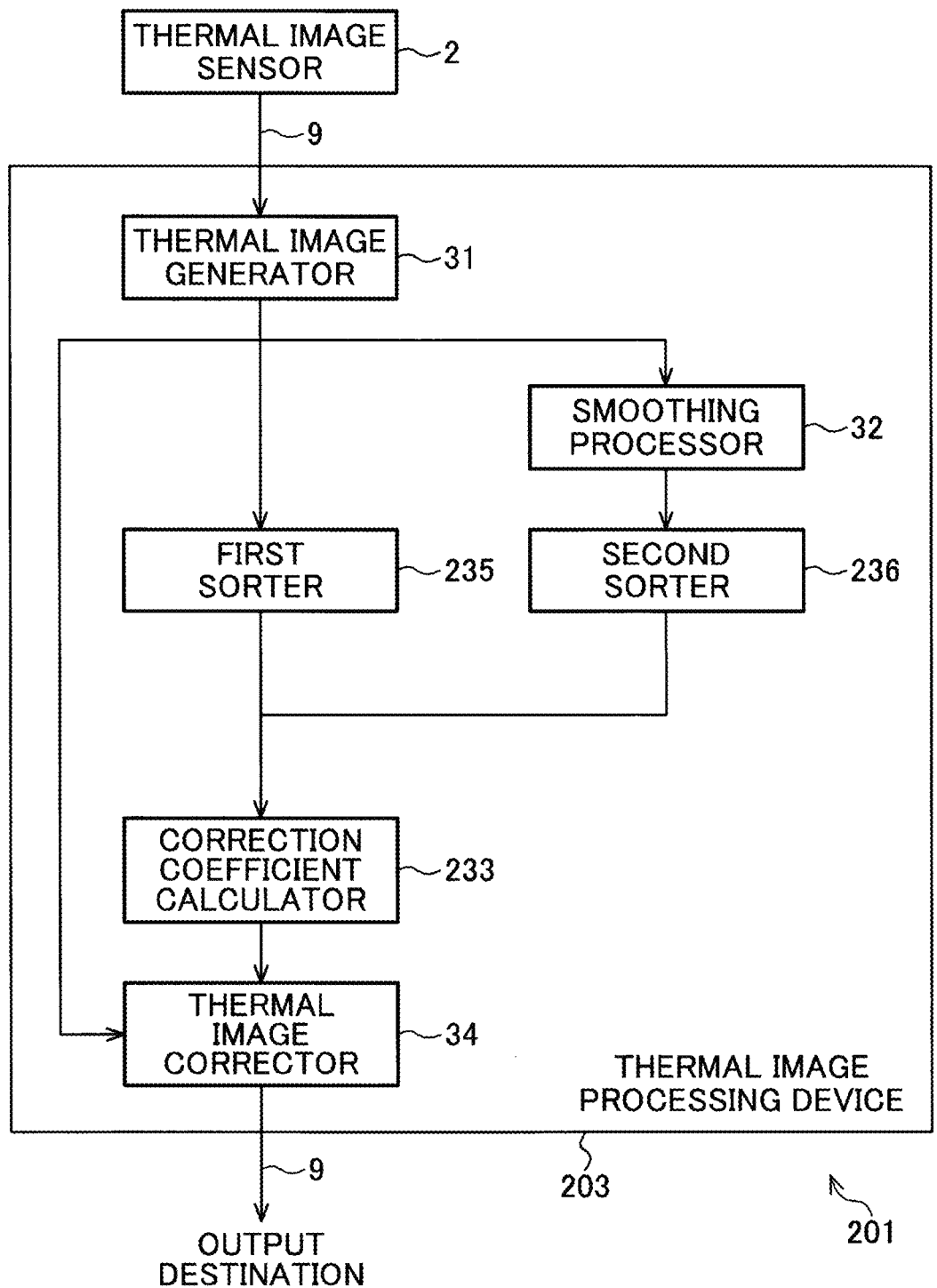
FIG. 8 is a block diagram illustrating a configuration of an infrared imaging device according to a second embodiment of the present invention.

An infrared imaging device 201 of the second embodiment includes a first sorter 235 and a second sorter 236, in addition to the configuration of the first embodiment, as illustrated in FIG. 8.

The first sorter 235 has a function of rearranging target pixel values arranged in the row direction in a thermal image in descending or ascending order.

The second sorter 236 has a function of rearranging smoothed pixel values arranged in the row direction in a smoothed thermal image in descending or ascending order.

The first sorter 235 and second sorter 236 will be collectively referred to simply as a sorter.

Figure 9:
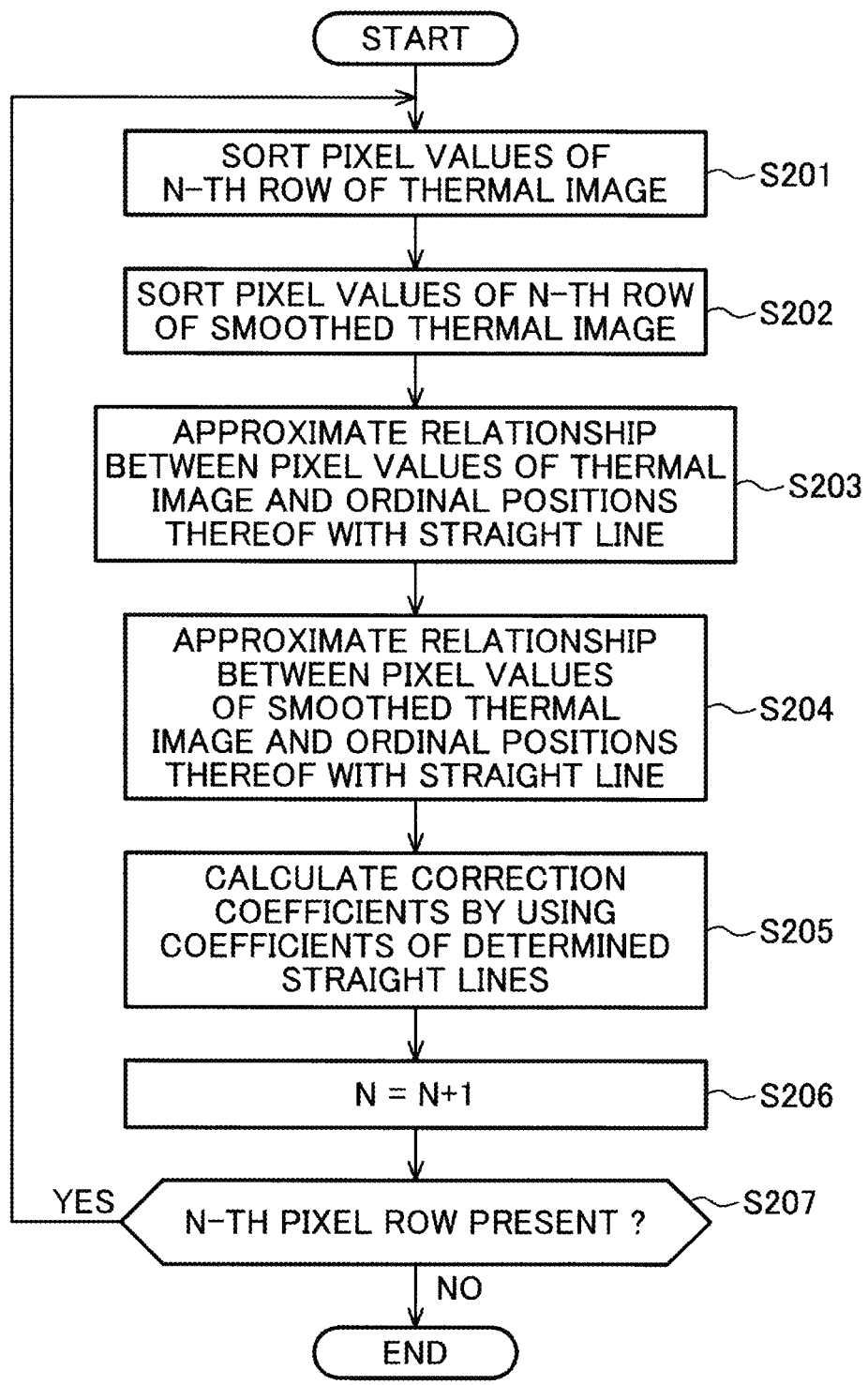
FIG. 9 is a flowchart illustrating a process of calculating correction coefficients by the infrared imaging device according to the second embodiment of the present invention.

Next, a process of calculating correction coefficients by the infrared imaging device 201 according to the second embodiment will be described with reference to FIG. 9. Also in the second embodiment, the process of steps S101 to S105 (FIG. 5) in the first embodiment is similarly performed. Thus, the flowchart of FIG. 9 illustrates a process of the second embodiment after the process of step S105 is finished.

First, the first sorter 235 sorts the target pixel values of the N-th row of the thermal image in descending or ascending order (step S201). Here, N is a nature number, and N is set to 1 as an initial value when the process of this flowchart is started.

Specifically, the processor 4 reads, from the memory 5, etc., the target pixel values of the N-th row of the thermal image, sorts the pixel values in descending or ascending order by a known method, such as bubble sort, and stores the pixel values in the order after the sorting, in the memory 5, etc.

Also, the second sorter 236 sorts the smoothed pixel values of the N-th row of the smoothed thermal image in descending or ascending order (step S202). This is the same process as that of step S201 except only that the pixel values to be sorted are the smoothed pixel values.

Figure 10A:
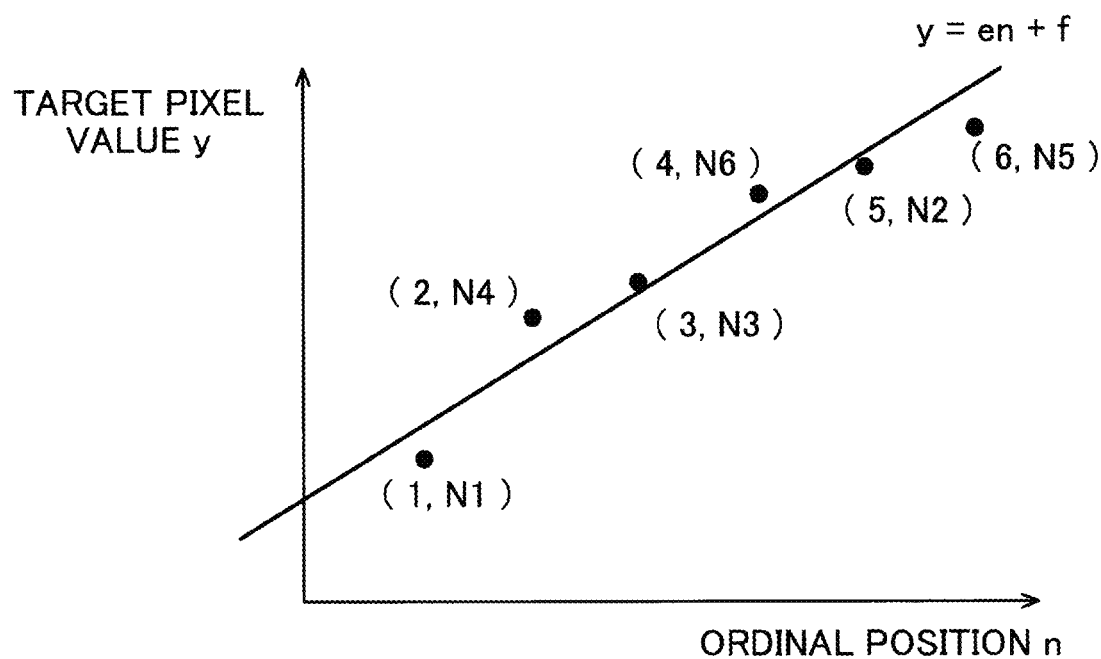
FIGS. 10A and 10B are graphs for explaining the process of calculating the correction coefficients by the infrared imaging device according to the second embodiment of the present invention.

Then, a correction coefficient calculator 233 sets coordinates (n, y) consisting of the target pixel values y of the thermal image and the ordinal positions n thereof, plots them in an n-y coordinate space as illustrated in FIG. 10A, approximates them with a straight line to determine a straight line equation y=en+f, and calculates the coefficients e and f (step S203).

Figure 10B:
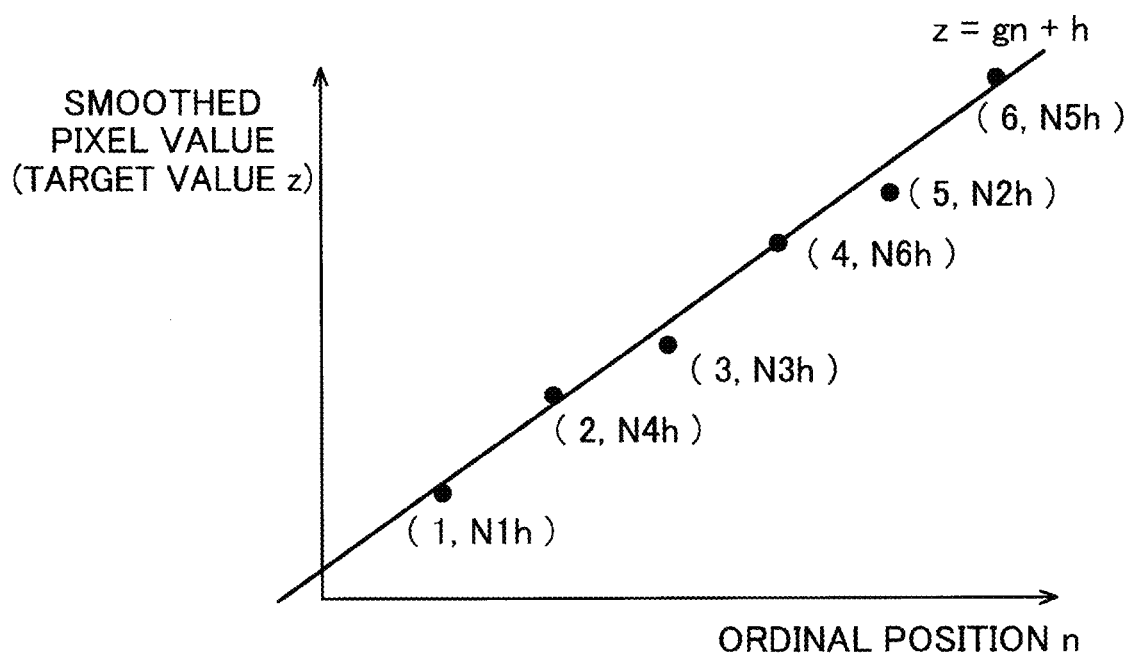

Similarly, the correction coefficient calculator 233 sets coordinates (n, z) consisting of the smoothed pixel values z of the smoothed thermal image and the ordinal positions n thereof, plots them in an n-z coordinate space as illustrated in FIG. 10B, approximates them with a straight line to determine a straight line equation z=gn+h, and calculates the coefficients g and h (step S204).

A specific process of steps S203 and S204 by the processor 4 is as follows. The processor 4 reads, from the memory 5, etc., the sorted target pixel values of the N-th row of the thermal image, sets coordinates consisting of the target pixel values y and the ordinal positions n thereof, and calculates the coefficients e and f by using a least-squares method so that distances between the coordinates and the straight line equation y=en+f are minimized. Also for the smoothed thermal image, the processor 4 performs the same process and calculates the coefficients g and h of the straight line equation z=gn+h.

The target pixel values y have been sorted, and although they were originally arranged in the order of N1, N2, N3, N4, N5, and N6, they have been rearranged in the order of N1, N4, N3, N6, N2, and N5. The smoothed pixel values z thereof have also been sorted, and although they were originally arranged in the order of N1$h$, N2$h$, N3$h$, N4$h$, N5$h$, and N6$h$, they have been rearranged in the order of N1$h$, N4$h$, N3$h$, N6$h$, N2$h$, and N5$h$ (FIGS. 10A and 10B). Since the target pixel values N1, N2, N3, N4, N5, and N6 before the sorting and the smoothed pixel values N1$h$, N2$h$, N3$h$, N4$h$, N5$h$, and N6$h$ before the sorting are pixel values of the same pixels, the ordinal positions of the pixel values correspond to each other. On the other hand, although the sorting may collapse the correspondence relationship between the ordinal positions, since the smoothed pixel values are calculated by using the adjacent pixel values and the distributions of the adjacent pixel values generally correlate with the distribution of the target pixel values, the ordinal positions after the sorting generally maintains the correspondence relationship. Thus, the ordinal position n in the straight line equation y=en+f corresponds to the ordinal position n in the straight line equation z=gn+h.

Then, the correction coefficient calculator 233 calculates correction coefficients c and d from the calculated coefficients e, f, g, and h (step S205).

Since the ordinal position n in the straight line equation y=en+f of the thermal image and the ordinal position n in the straight line equation z=gn+h of the smoothed thermal image correspond to each other as described above, the correction coefficients c and d can be determined by transforming one of the equations into a form of n=, and substituting it into the other equation to transform it into a form of z=cy+d. The equation obtained by the transformation is as follows:

$$z = \frac{g}{e}y - \frac{gf}{e} + h.$$

Thus, the correction coefficients c and d can be expressed by using the coefficients e, f, g, and h as follows:

$$c = \frac{g}{e}$$
$$d = \frac{gf}{e} + h.$$

Specifically, the processor 4 reads, from the memory 5, etc., the above conversion equations between the correction coefficients c and d and the coefficients e, f, g, and h, substitutes the coefficients e, f, g, and h to calculate the correction coefficients c and d, and stores them in the memory 5, etc.

Then, the correction coefficient calculator 233 (processor 4) sets N to N+1 (step S206), determines whether a pixel row is present at the N-th row (where N has been set to N+1) (step S207), and when it is present (YES in step S207), repeats the process of steps S201 to S206. When it is not present (NO in step S207), since the correction coefficients c and d have been calculated for all the rows of the thermal image, the process ends.

The infrared imaging device 201 according to the second embodiment of the present invention is configured as described above, and provides the following advantages.

The infrared imaging device 201 according to the second embodiment provides the same advantages, except the advantage of the first embodiment that it is possible to calculate the correction coefficients merely by setting coordinates and performing a linear approximation process once.

Third Embodiment

A third embodiment of the present invention will now be described. For parts that are the same as configurations and operations described in the first and second embodiments, description will be omitted, and parts different from the first and second embodiments will be described below.

The first and second embodiments each calculate correction coefficients by using target pixel values of a thermal image and the smoothed pixel values (target values) of the smoothed thermal image.

The third embodiment determines, for each row, correction coefficients c and d by approximating a sequence obtained by sorting the target pixel values of the thermal image in descending or ascending order with a straight line to determine y=en+f (where y is the target pixel value, n is the ordinal position of the target pixel value, and e and f are coefficients), determining z=in +j (where z is a target value, n is the ordinal position of the target value, and i and j are coefficients) by using the coefficients included in the straight line equations of the target pixel values of the adjacent rows, instead of the straight line equation of the smoothed pixel values (target values) of the smoothed thermal image, and combining and transforming these equations into a form of z=cy+d.

Figure 11:
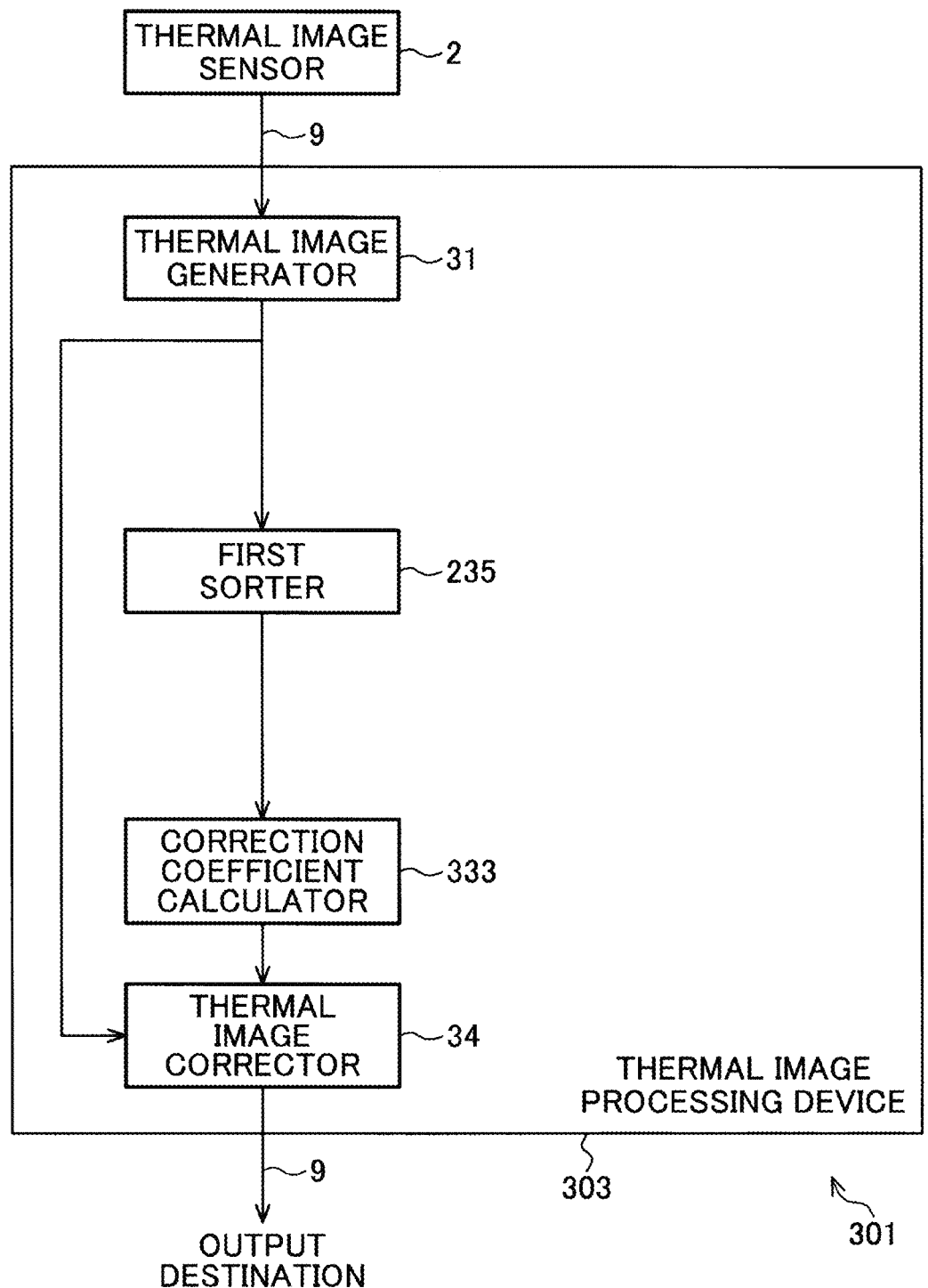
FIG. 11 is a block diagram illustrating a configuration of an infrared imaging device according to a third embodiment of the present invention.

An infrared imaging device 301 of the third embodiment is obtained by removing the smoothing processor 32 and second sorter 236 from the configuration of the second embodiment, as illustrated in FIG. 11.

Figure 12:
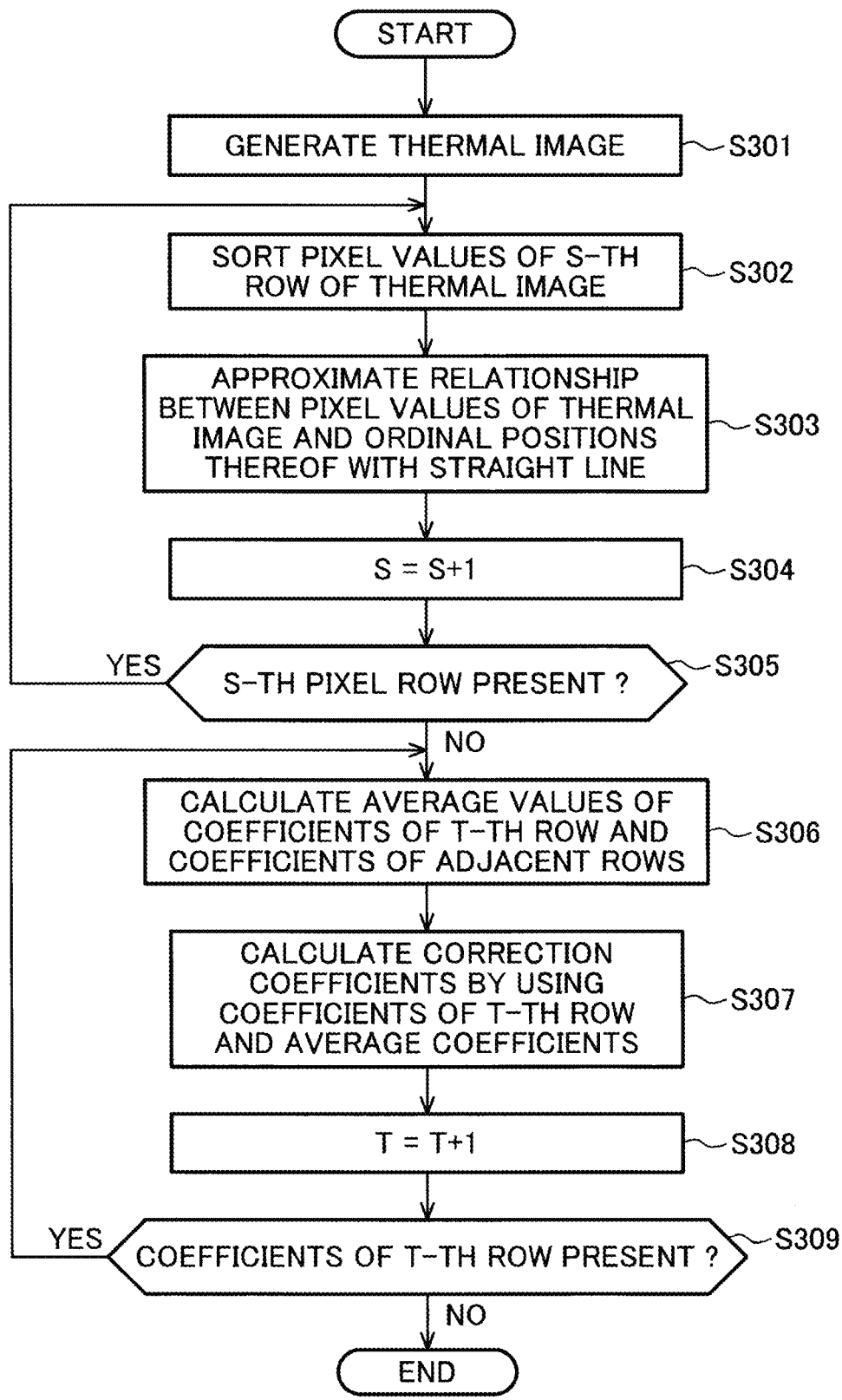
FIG. 12 is a flowchart illustrating a process of calculating correction coefficients by the infrared imaging device according to the third embodiment of the present invention.

Next, a process of calculating the correction coefficients by the infrared imaging device 301 according to the third embodiment will be described with reference to FIG. 12. The flowchart of FIG. 12 is a flowchart corresponding to FIGS. 5 and 9, and differences from FIGS. 5 and 9 will be mainly described.

First, the thermal image generator 31 generates a single thermal image from the voltage signals from the thermal image sensor 2 (step S301). This process is the same as that of step S101 of FIG. 5.

Then, the first sorter 235 sorts the target pixel values included in the pixel row that is a set of the pixels arranged in the S-th row of the single thermal image, in descending or ascending order (step S302). This process is the same as that of step S201 of FIG. 9. S is a nature number, and S is set to 1 as an initial value when the process of this flowchart is started.

Then, a correction coefficient calculator 333 approximates coordinates of the target pixel values (after the sorting) that are pixels included in the thermal image and the ordinal positions thereof, with a straight line, and calculates the coefficients e and f included in the straight line equation y=en+f (step S303). This process is the same as the process of step S203 of FIG. 9.

Then, the correction coefficient calculator 333 (processor 4) sets S to S+1 (step S304), determines whether a pixel row is present at the S-th row (where S has been set to S+1) (step S305), and when it is present (YES in step S305), repeats the process of steps S302 to S304. By the repetition, not only the S-th pixel row but also a pixel row adjacent to the S-th pixel row in the column direction is sorted, and the coefficients e and f included in the straight line equation y=en+f are calculated. When it is not present (NO in step S305), since the coefficients e and f of the straight line equation have been calculated for all the rows of the thermal image, the process of step S306 is started.

Then, the correction coefficient calculator 333 calculates average values of the coefficients e and f of the straight line equations of the T-th row, (T−1)th row, and (T+1)th row, and calculates average coefficients i and j that are the average values of the coefficients (step S306). The average coefficients i and j are considered as the coefficients of a straight line equation z=in +j when the target values z are arranged in descending or ascending order. The reason is as follows.

The target pixel values y of the target row and the adjacent rows are increased or decreased due to the streak noise to a greater or lesser degree. Thus, average values of these target pixel values y are near the target values z, with the increase and decrease due to the streak noise cancelled. Thus, by averaging the multiple straight line equations, it can be considered that $y_{AVE}=e_{AVE} \cdot n+f_{AVE}=z$.

From the above, the average coefficient i can be calculated as $e_{AVE}$, i.e., an average of the coefficients e of the target row and the adjacent rows, and the average coefficient j can be calculated as $f_{AVE}$, i.e., an average of the coefficients f of the target row and the adjacent rows.

Here, T is a nature number, and T is set to 1 as an initial value when the process of this flowchart is started.

The process of averaging the coefficients is specifically as follows. The processor 4 reads, from the memory 5, the coefficients of the straight line equations of the T-th row, (T−1)th row, and (T+1)th row, calculates an average value of the coefficients e and an average value of the coefficients f, and stores them as the average coefficients i and j in the memory 5, etc.

When T=1, i.e., when the coefficients of the uppermost row of the thermal image is read, since the (T−1)th row is not present, it is assumed that coefficients that are the same as those of the T-th or (T+1)th row are present at the (T−1)th row, and the coefficients of the T-th or (T+1)th row that have been separately read are treated as the coefficients of the (T−1)th row. Similarly, for the lowermost row of the thermal image, since the coefficients of the (T+1)th row are not present, the coefficients of the T-th or (T−1)th row that have been separately read are treated as the coefficients of the (T+1)th row.

Then, the correction coefficient calculator 333 calculates the correction coefficients c and d from the calculated coefficients e and f and the average coefficients i and j (step S307). At this time, the process and concept of combining y=en+f and z=in +j to determine the correction coefficients are the same as those of step S205 of FIG. 9.

Specifically, the processor 4 reads, from the memory 5, etc., the above conversion equations (which are the same as those in step S205 of FIG. 9) between the correction coefficients c and d and the coefficients e and f and average coefficients i and j, substitutes the coefficients e and f and average coefficients i and j to calculate the correction coefficients c and d, and stores and updates them in the memory 5, etc.

Then, the correction coefficient calculator 333 (processor 4) sets T to T+1 (step S308), determines whether the coefficients are present at the T-th row (where T has been set to T+1) (step S309), and when they are present (YES in step S309), repeats the process of steps S306 to S308. When they are not present (NO in step S309), since the correction coefficients c and d have been calculated for all the rows of the thermal image, the process ends.

The infrared imaging device 301 according to the third embodiment of the present invention is configured as described above, and provides the following advantages.

The infrared imaging device 301 according to the third embodiment can not only provide the same advantages as the first embodiment, but also quickly calculate the correction coefficients without needing to perform the smoothing process on the thermal image and the sorting process on the smoothed pixel values included in the smoothed thermal image.

Fourth Embodiment

A fourth embodiment of the present invention will now be described. For parts that are the same as configurations and operations described in the first, second, and third embodiments, description will be omitted, and parts different from the first, second, and third embodiments will be described below. The fourth embodiment can be implemented in combination with the first, second, or third embodiment.

Although an infrared imaging device of the fourth embodiment has the same configuration as that of the second embodiment (FIG. 8), a function of removing a subset of the pixel values of the thermal image and the pixel values of the smoothed thermal image is added to the correction coefficient calculator.

The correction coefficient calculator has a function of removing pixel values located in end portions of a sorted pixel row of the thermal image. It also has a function of removing smoothed pixel values located in end portions of a sorted pixel row of the smoothed thermal image.

Removing the end portions of the respective sorted pixel rows indicates that large values and small values in the pixel rows are not used in the subsequent process (e.g., the process of calculating the correction coefficients c and d) by the correction coefficient calculator. For example, when there are objects, such as a light bulb, a gas stove, or a person, in the room, edge portions that are their outlines appear in the thermal image. In the first or second embodiment, when the smoothing process is performed on the thermal image, the edge portions are smoothed by the smoothing, so that the accuracy of the smoothed pixel values as the target values may be decreased. In addition, a window cooled by outdoor air or the like may also decrease the accuracy. The correction coefficient calculator removes objects, such as these examples, having large values and small values in the pixel rows, from the correction coefficient calculation process.

Although the process of calculating the correction coefficients by the infrared imaging device of the fourth embodiment is the same as that of the flowchart of FIG. 9 in the second embodiment, the process of removing the end portions of the pixel rows is added between step S202 and step S203. Also, since the two correction coefficients are calculated after the end portions are removed, it is required that a pixel row located in the direction in which the streak noise occurs in the thermal image include at least four pixel values.

The process of removing the end portions will be specifically described. The processor 4 reads, from the memory 5, etc., a threshold for removing large values in the pixel row of the thermal image, determines whether the value is larger than the threshold, in order from the largest value in the sorted pixel row, repeats the determination until a value not larger than the threshold is found, and removes, from the pixel row, the pixel values larger than the threshold.

Similarly, the processor 4 reads, from the memory 5, etc., a threshold for removing small values in the pixel row of the thermal image, scans the pixel row from the smallest value, and removes, from the pixel row, the pixel values smaller than the threshold.

This process is also performed on the smoothed thermal image.

The infrared imaging device according to the fourth embodiment of the present invention is configured as described above, and provides the following advantages.

A thermal image captured by the infrared imaging device may include images of heat sources, such as persons. Also, it may include images of extremely cooled objects, such as windows. Edge portions of these objects disappear due to the smoothing process, so that the accuracy of the target values is decreased. Thus, the infrared imaging device of the fourth embodiment removes these objects from the correction coefficient calculation process. This can reduce the decrease in accuracy of the calculated correction coefficients.

Here, a description of modifications and a supplemental description of the infrared imaging device of the fourth embodiment will be made.

The infrared imaging device 1 of the fourth embodiment determines pixel values to be removed, by comparing end portions of the sorted pixel rows with the thresholds. However, it is possible to previously determine the number of pixel values to be removed and remove a corresponding number of pixel values, without using a threshold.

Also, the infrared imaging device of the fourth embodiment removes the pixel values in both end portions of a pixel row. However, it is possible to remove only one end portion. In this case, it is sufficient that a pixel row located in the direction in which the streak noise occurs in the thermal image include at least three pixel values.

Also, the infrared imaging device of the fourth embodiment removes end portions of the sorted pixel rows. However, it is possible to determine, for each of the pixel values of the unsorted pixel rows, whether to remove the pixel value, by using threshold(s).

Fifth Embodiment

A fifth embodiment of the present invention will now be described. For parts that are the same as configurations and operations described in the first, second, third, and fourth embodiments, description will be omitted, and parts different from the first, second, third, and fourth embodiments will be described below. The fifth embodiment can be implemented in combination with one or more of the first, second, third, and fourth embodiments, and the modifications thereof.

The first embodiment uses the thermal image sensor 2 in which the infrared detection elements are arranged in a matrix.

The fifth embodiment uses a thermal image sensor 502 in which multiple infrared detection elements are arranged in a line in a height direction, and generates a single thermal image by moving the thermal image sensor 502 in a width direction and combining voltage signals that are outputs of the infrared detection elements.

Figure 13:
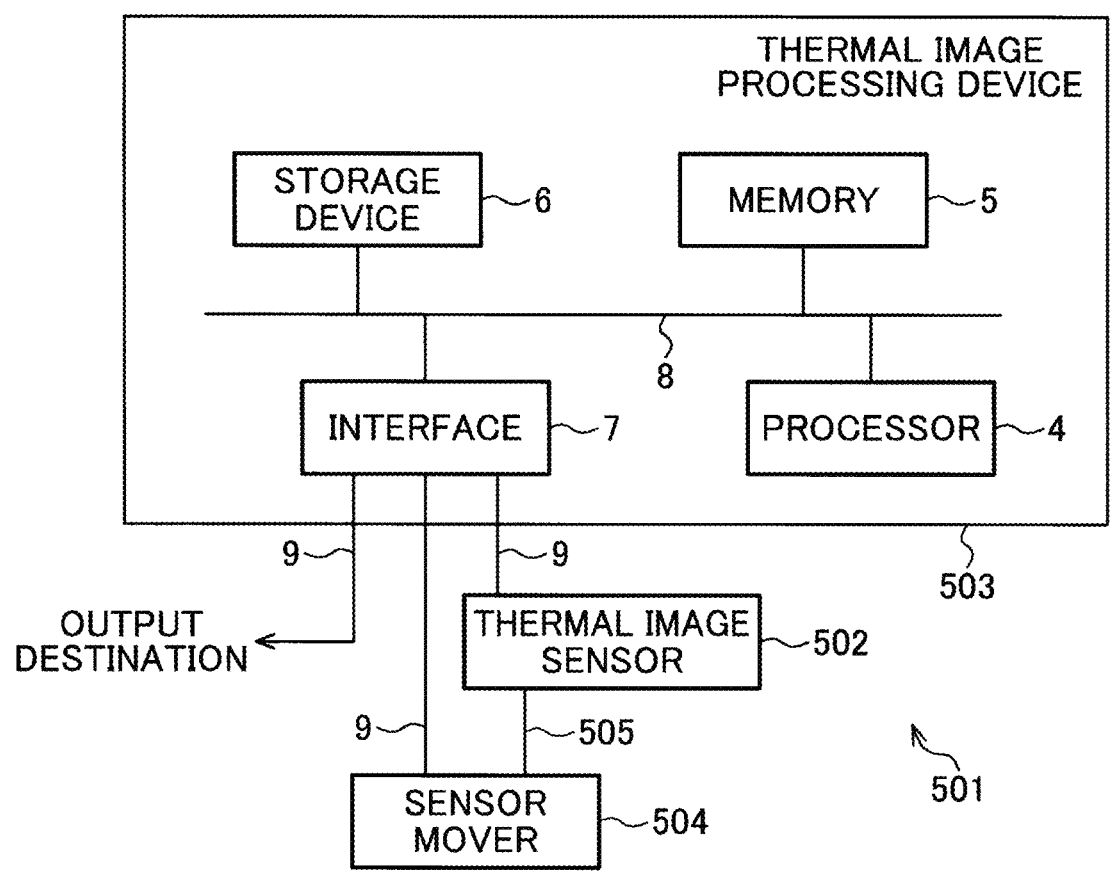
FIG. 13 is a block diagram illustrating a configuration of an infrared imaging device according to a fifth embodiment of the present invention.
Figure 14:
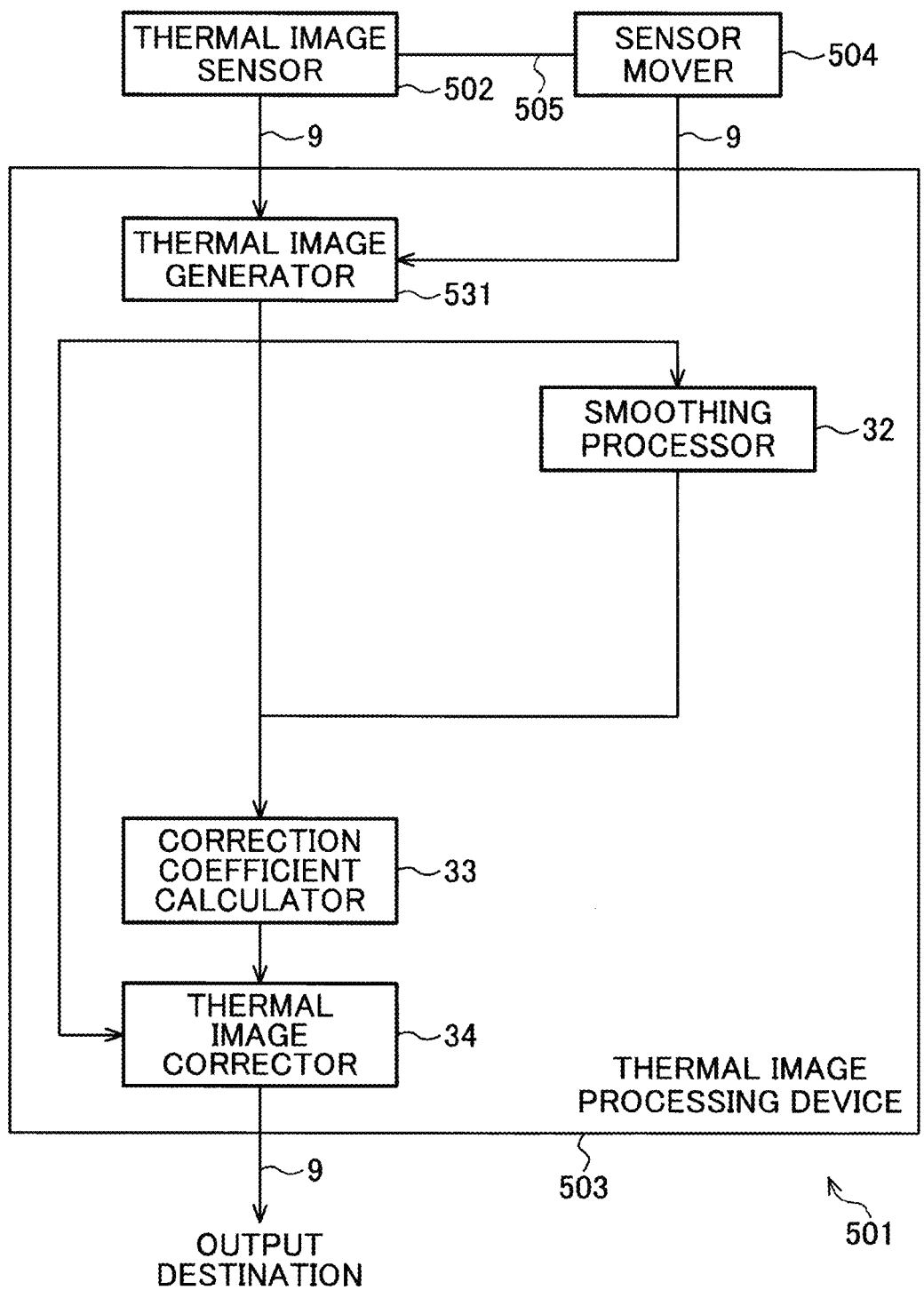
FIG. 14 is a block diagram illustrating the configuration of the infrared imaging device according to the fifth embodiment of the present invention.

In an infrared imaging device 501 of the fifth embodiment, the configuration of the thermal image sensor 502 is different as described above, and besides, a sensor mover 504 is added to the configuration of the infrared imaging device 1 of the first embodiment, as illustrated in FIGS. 13 and 14.

The thermal image sensor 502 is obtained by arranging the multiple infrared detection elements in a line in the height direction.

The sensor mover 504 moves the thermal image sensor 502 in the width direction, i.e., a direction crossing the direction in which the infrared detection elements of the thermal image sensor 502 are arranged, to change the position of the thermal image sensor 502. Specifically, it is a motor, a rotary shaft of the motor is connected to the thermal image sensor 502 through a drive member 505, and a rotary motion of the motor is transmitted to the thermal image sensor 502.

Also, the sensor mover 504 includes a rotary encoder, and transmits a signal indicating the amount of rotation of the motor, i.e., the amount of movement of the thermal image sensor 502, to a thermal image processing device 503 (more specifically, a thermal image generator 531) through a communication line 9.

The thermal image generator 531 of the infrared imaging device 501 of the fifth embodiment receives voltage signals from the thermal image sensor 502 corresponding to infrared light received by the thermal image sensor 502 while the thermal image sensor 502 is moving, and the signal from the sensor mover 504 indicating the movement amount, rearranges the voltage signals, and generates a single thermal image.

The thermal image sensor 502, the sensor mover 504, and the generated thermal image in the fifth embodiment will be described with reference to FIGS. 15A to 15C.

Figure 15A:
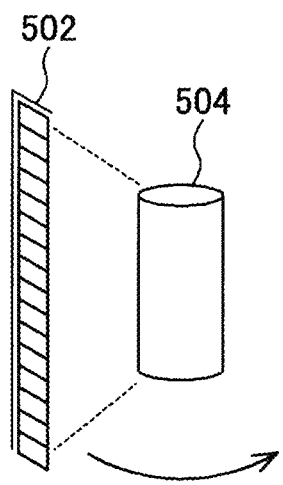
FIGS. 15A to 15C are schematic diagrams of a thermal image sensor and a sensor mover of the infrared imaging device according to the fifth embodiment of the present invention, and a schematic diagram of a thermal image.

FIG. 15A is a diagram illustrating an example in which the thermal image sensor 502 is configured to rotate about the rotary shaft of the sensor mover 504. The thermal image sensor 502 rotates in an arc concentric with the rotary shaft, and transmits voltage signals corresponding to ambient infrared light.

Figure 15B:
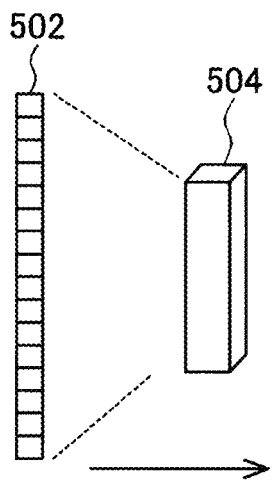

FIG. 15B is a diagram illustrating an example in which the thermal image sensor 502 is configured to translate in accordance with the rotary motion of the sensor mover 504. The thermal image sensor 502 transmits voltage signals corresponding to ambient infrared light while translating.

Figure 15C:
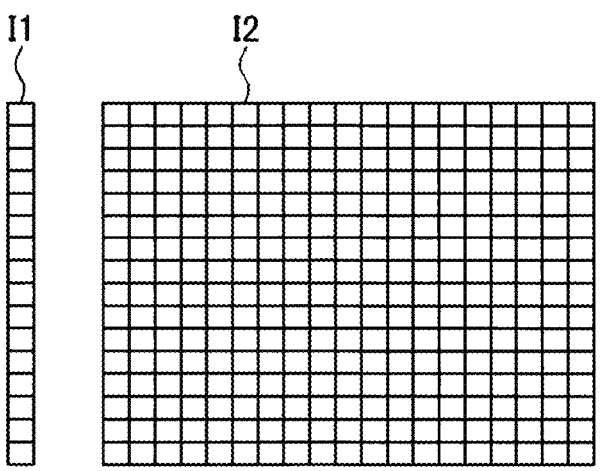

FIG. 15C is a diagram illustrating an example of a thermal image I1 generated from voltage signals of the thermal image sensor 502 at a certain position and a single thermal image I2 obtained by combining multiple thermal images I1. The single thermal image I2 is a combination of thermal images I1 during movement of the thermal image sensor 502 within the range of movement.

The infrared imaging device 501 according to the fifth embodiment of the present invention is configured as described above, and provides the following advantages.

The infrared imaging device 501 of the fifth embodiment does not require that infrared detection elements be arranged in a matrix, and can capture a thermal image with a small number of infrared detection elements. Reducing the number of infrared detection elements allows the infrared imaging device 501 to be installed even when there is no space to arrange infrared detection elements in a matrix. Also, reducing the number of infrared detection elements can reduce the cost for installing the infrared imaging device 501.

Also, even when a thermal image is captured by the infrared imaging device 501 of the fifth embodiment, the streak noise can occur. When the coefficient a (sensitivity) or the coefficient b, which is an intercept component, in an equation $y=ax+b$ (see FIG. 2) representing the input-output relationship varies between the infrared detection elements arranged in the height direction, it can make streak noise when an image is composed. However, the infrared imaging device 501 of the fifth embodiment can calculate the correction coefficients as with the first embodiment or the like, and thus can perform a process of reducing the streak noise. In addition, the same advantages as the first, second, third, and fourth embodiments are provided.

Here, a description of modifications and a supplemental description of the infrared imaging device 501 of the fifth embodiment will be made.

The fifth embodiment describes an example in which the position of the thermal image sensor 502 is moved by the sensor mover 504. However, it is possible to fix the thermal image sensor 502 on the rotary shaft of the motor and change the orientation of the thermal image sensor 502.

Also, the fifth embodiment describes an example in which the infrared detection elements of the thermal image sensor 502 are arranged in the height direction and the sensor mover 504 moves the thermal image sensor 502 in the width direction. However, it is possible that the infrared detection elements of the thermal image sensor 502 are arranged in the width direction and the sensor mover 504 moves the thermal image sensor 502 in the height direction.

The first to fifth embodiments have been described above. Here, a description of modifications and a supplemental description of the first to fifth embodiments will be made.

The infrared imaging devices of the first to fifth embodiments use linear functions as the straight line equations and correction equations and calculate the coefficients and correction coefficients. However, polynomial functions, such as cubic functions, may be used. By using a high-order polynomial function, it is possible to accurately approximate pixel values. Also, when a high-order polynomial function is used, the number of the correction coefficients is two or more.

In the first to fifth embodiments, the direction in which the streak noise occurs is the row direction of the thermal image. However, it may be the column direction or an oblique direction.

It has been described that streak noise occurs in the row direction due to the fact that a drive line is connected to infrared detection elements arranged in the row direction. However, when a drive line is connected in the column direction or an oblique direction, streak noise occurs in the column direction or the oblique direction.

Also, in the first to fifth embodiments, it has been described that streak noise occurs due to difference in characteristics between the drive lines. However, the cause of occurrence of streak noise is not limited to this. When infrared detection elements arranged in the row direction or the like are connected by the same output line (which is a line for transmitting voltage signals), streak noise can occur due to variation in characteristics between the output lines. It can also occur due to variation in characteristics between A/D converters or amplifiers connected to the output lines.

Further, in the process of generating the image, a noise reduction process other than the process of reducing streak noise may be performed. When this process is performed for each row, the degree of the noise reduction process varies with each row, and streak noise can occur.

The infrared imaging devices of the first to fifth embodiments can also reduce these streak noises.

Although the infrared imaging devices of the first to fifth embodiments use pyroelectric elements as the infrared detection elements, it is also possible to use thermopile-type infrared detection elements obtained by connecting thermocouples exhibiting the Seebeck effect, bolometer-type infrared detection elements that uses change in resistance with temperature information, or other infrared detection elements. They may be of any type as long as they can detect infrared light.

In the first to fifth embodiments, the thermal image generator included in the thermal image processing device receives the voltage signals from the thermal image sensor to generate a thermal image. However, the thermal image generator may be provided in the thermal image sensor.

In the first and second embodiments, a process of determining an average value of a target pixel value and the adjacent pixel values is performed as the smoothing process. However, it is possible to weight each of the target pixel value and adjacent pixel values for determining an average value and determine an average value of them. Also, it is possible to determine an average value by using only the adjacent pixel values without using the target pixel value. Also, although it has been described that the smoothing process is performed by using the three pixel values including the target pixel value and two adjacent pixel values, it is also possible to perform the smoothing process by using five pixel values by further using two pixel values adjacent to the adjacent pixel values. It is also possible to perform the smoothing process by using five or more pixel values by using further adjacent pixel values.

Although in the third embodiment, average values of the coefficients of three adjacent rows are calculated to determine the average coefficients, it is also possible to weight each of the coefficients and determine average values. Also, it is possible to determine the average coefficients by using only the coefficients of the adjacent rows without using the coefficients of the row for which the correction coefficients are to be determined. Also, it is possible to determine average values by using the coefficients of five rows by using the coefficients of not only the three adjacent rows but also the two rows adjacent to the three rows. It is also possible to determine average values by using the coefficients of five or more rows by using the coefficients of further adjacent rows.

The infrared imaging devices of the first to fifth embodiments are described as being installed in an electric product in a room. By installing it in an electric product, it is possible to use the thermal image for control of the electric product. Also, it is possible to use the thermal image to determine the temperature condition in the room in which the electric product is installed.

The infrared imaging devices of the first to fifth embodiments may not only be installed in an electric product, but also be used as a security or monitoring camera installed indoors or outdoors.

The infrared imaging devices of the first to fifth embodiments start the correction coefficient calculation process in accordance with the flowchart of FIG. 5 or the like each time a predetermined time elapses after the process of performing correction or the like on the thermal image in accordance with the flowchart of FIG. 4 is started. However, it is also possible to perform the correction coefficient calculation process each time a single thermal image is generated, or simultaneously with the process of the flowchart of FIG. 4 each time it is performed.

Also, since the intensity of streak noise may change depending on the external ambient temperature, it is possible to provide the infrared imaging device with a temperature detector, and start the correction coefficient calculation process when the temperature changes by a predetermined threshold or more.

Also, in the case of simultaneously performing the process of performing correction or the like on the thermal image in accordance with the flowchart of FIG. 4 and the process of calculating the correction coefficients in accordance with the flowchart of FIG. 5 or the like, the process of generating a thermal image is common and thus need not be separately performed.

The infrared imaging devices of the first to fifth embodiments can be implemented by installing a program for causing a computing device, such as a computer, to execute the processes performed by the thermal image generator, smoothing processor, correction coefficient calculator, thermal image corrector, first sorter, and second sorter, in a computing device.

INDUSTRIAL APPLICABILITY

The infrared imaging device of the present invention can be used as a camera for controlling an electric product, or a security or monitoring camera.

REFERENCE SIGNS LIST 1, 201, 301, 501 infrared imaging device, 2, 502 thermal image sensor, 3, 203, 503 thermal image processing device, 4 processor, 5 memory, 6 storage device, 7 interface, 8 data bus, 9 communication line, 31, 531 thermal image generator, 32 smoothing processor, 33, 233, 333 correction coefficient calculator, 34 thermal image corrector, 235 first sorter, 236 second sorter, 504 sensor mover, 505 drive member.

The invention claimed is:
1. An infrared imaging device comprising:
a thermal image sensor to receive infrared light and output a signal corresponding to the infrared light;
a thermal image generator to generate a single thermal image on a basis of the signal from the thermal image sensor;
correction coefficient calculation circuitry configured to calculate a plurality of correction coefficients included in a correction equation for converting pixel values of pixels included in the single thermal image into target values in which streak noise extending from one end to another end of the single thermal image is reduced; and
thermal image correction circuitry configured to correct a thermal image generated by the thermal image generator by using the plurality of correction coefficients,
wherein the correction coefficient calculation circuitry calculates the plurality of correction coefficients on a basis of difference between pixel values of pixels arranged in a direction in which the streak noise occurs in the single thermal image,
wherein the infrared imaging device further comprises smoothing processing circuitry configured to perform a smoothing process on the pixel values of the pixels arranged in the direction in which the streak noise occurs, by using pixel values of pixels adjacent to the pixels arranged in the direction in which the streak noise occurs in a direction crossing the direction in which the streak noise occurs, and calculate, as the target values, smoothed pixel values that are pixel values after smoothing,
wherein the correction coefficient calculation circuitry approximates a plurality of coordinates represented by the pixel values of the pixels arranged in the direction in which the streak noise occurs and the smoothed pixel values, with a polynomial function that is the correction equation, and calculates the plurality of correction coefficients included in the polynomial function.

2. The infrared imaging device of claim 1, further comprising:
a sensor mover to move the thermal image sensor to change a position or an orientation of the thermal image sensor,
wherein the thermal image generator generates the single thermal image from the signal corresponding to the infrared light received by the thermal image sensor while the thermal image sensor is moving.

3. The infrared imaging device of claim 1, wherein the single thermal image is a thermal image imaged by the thermal image sensor in an exposure state.

4. An infrared imaging device, comprising:
a thermal image sensor to receive infrared light and output a signal corresponding to the infrared light;
a thermal image generator to generate a single thermal image on a basis of the signal from the thermal image sensor;
correction coefficient calculation circuitry configured to calculate a plurality of correction coefficients included in a correction equation for converting pixel values of pixels included in the single thermal image into target values in which streak noise extending from one end to another end of the single thermal image is reduced; and
thermal image correction circuitry configured to correct a thermal image generated by the thermal image generator by using the plurality of correction coefficients,
wherein the correction coefficient calculation circuitry calculates the plurality of correction coefficients on a basis of difference between pixel values of pixels arranged in a direction in which the streak noise occurs in the single thermal image,
wherein the infrared image device further comprises:
smoothing processing circuitry configured to perform a smoothing process on the pixel values of the pixels arranged in the direction in which the streak noise occurs, by using pixel values of pixels adjacent to the pixels arranged in the direction in which the streak noise occurs in a direction crossing the direction in which the streak noise occurs, and calculate, as the target values, smoothed pixel values that are pixel values after smoothing; and
a sorter to sort the pixel values of the pixels arranged in the direction in which the streak noise occurs in descending or ascending order, and sort the smoothed pixel values in descending or ascending order,
wherein the correction coefficient calculation circuitry approximates coordinates represented by the pixel values of the pixels arranged in the direction in which the streak noise occurs and ordinal positions thereof, with a polynomial function, approximates coordinates represented by the smoothed pixel values and ordinal positions thereof, with a polynomial function, and calculates the plurality of correction coefficients of the correction equation by using coefficients of each polynomial function.

5. The infrared imaging device of claim 4, wherein the single thermal image is a thermal image imaged by the thermal image sensor in an exposure state.

6. The infrared imaging device of claim 4, further comprising:
a sensor mover to move the thermal image sensor to change a position or an orientation of the thermal image sensor,
wherein the thermal image generator generates the single thermal image from the signal corresponding to the infrared light received by the thermal image sensor while the thermal image sensor is moving.

7. An infrared imaging device, comprising:
a thermal image sensor to receive infrared light and output a signal corresponding to the infrared light;
a thermal image generator to generate a single thermal image on a basis of the signal from the thermal image sensor;
correction coefficient calculation circuitry configured to calculate a plurality of correction coefficients included in a correction equation for converting pixel values of pixels included in the single thermal image into target values in which streak noise extending from one end to another end of the single thermal image is reduced; and
thermal image correction circuitry configured to correct a thermal image generated by the thermal image generator by using the plurality of correction coefficients,
wherein the correction coefficient calculation circuitry calculates the plurality of correction coefficients on a basis of difference between pixel values of pixels arranged in a direction in which the streak noise occurs in the single thermal image,
wherein the infrared image device further comprises:
a sorter to sort pixel values of pixels included in a pixel row that is a set of the pixels arranged in the direction in which the streak noise occurs in the single thermal image, in descending or ascending order, and sort pixel values of pixels included in a pixel row adjacent in a direction crossing the direction in which the streak noise occurs, in descending or ascending order,
wherein the correction coefficient calculation circuitry:
approximates coordinates represented by the pixel values of the pixels arranged in the direction in which the streak noise occurs and ordinal positions thereof, with a polynomial function, and calculates coefficients of the polynomial function,
approximates coordinates represented by the pixel values of the pixels included in the adjacent pixel row and ordinal positions thereof, with a polynomial function, and calculates coefficients of the polynomial function,
calculates average coefficients that are average values of the coefficients calculated on a basis of the pixel values of the pixels arranged in the direction in which the streak noise occurs and the coefficients calculated on a basis of the pixel values of the pixels included in the adjacent pixel row, and
calculates the plurality of correction coefficients of the correction equation by using the coefficients calculated on a basis of the pixel values of the pixels having different pixel values and the average coefficients.

8. The infrared imaging device of claim 7, wherein:
the single thermal image is a thermal image imaged by the thermal image sensor in an exposure state.

9. The infrared imaging device of claim 7, further comprising:
a sensor mover to move the thermal image sensor to change a position or an orientation of the thermal image sensor,
wherein the thermal image generator generates the single thermal image from the signal corresponding to the infrared light received by the thermal image sensor while the thermal image sensor is moving.

10. An infrared imaging device, comprising:
a thermal image sensor to receive infrared light and output a signal corresponding to the infrared light;

a thermal image generator to generate a single thermal image on a basis of the signal from the thermal image sensor;

correction coefficient calculation circuitry configured to calculate a plurality of correction coefficients included in a correction equation for converting pixel values of pixels included in the single thermal image into target values in which streak noise extending from one end to another end of the single thermal image is reduced; and thermal image correction circuitry configured to correct a thermal image generated by the thermal image generator by using the plurality of correction coefficients, wherein the correction coefficient calculation circuitry calculates the plurality of correction coefficients on a basis of difference between pixel values of pixels arranged in a direction in which the streak noise occurs in the single thermal image, wherein:
the pixels arranged in the direction in which the streak noise occurs include three or more pixels having different pixel values, and
the correction coefficient calculation circuitry calculates the plurality of correction coefficients without using a largest or smallest pixel value of the three or more different pixel values.

11. A non-transitory computer-readable storage medium storing an infrared imaging program for causing a computing device to function as:

a thermal image generator to generate a single thermal image on a basis of a signal output from a thermal image sensor;

correction coefficient calculation circuitry configured to calculate a plurality of correction coefficients included in a correction equation for converting pixel values of pixels included in the single thermal image into target values in which streak noise extending from one end to another end of the single thermal image is reduced; and thermal image correction circuitry configured to correct an image generated by the thermal image generator by using the plurality of correction coefficients, wherein the infrared imaging program is for causing the computing device to function to cause the correction coefficient calculation circuitry to calculate the plurality of correction coefficients on a basis of difference between pixel values of pixels arranged in a direction in which the streak noise occurs in the single thermal image, wherein the infrared imaging program further causes the computing device to function as smoothing processing circuitry configured to perform a smoothing process on the pixel values of the pixels arranged in the direction in which the streak noise occurs, by using pixel values of pixels adjacent to the pixels arranged in the direction in which the streak noise occurs in a direction crossing the direction in which the streak noise occurs, and calculate, as the target values, smoothed pixel values that are pixel values after smoothing, wherein the correction coefficient calculation circuitry approximates a plurality of coordinates represented by the pixel values of the pixels arranged in the direction in which the streak noise occurs and the smoothed pixel values, with a polynomial function that is the correction equation, and calculates the plurality of correction coefficients included in the polynomial function.

12. A non-transitory computer-readable storage medium storing an infrared imaging program for causing a computing device to function as:

a thermal image generator to generate a single thermal image on a basis of a signal output from a thermal image sensor;

correction coefficient calculation circuitry configured to calculate a plurality of correction coefficients included in a correction equation for converting pixel values of pixels included in the single thermal image into target values in which streak noise extending from one end to another end of the single thermal image is reduced; and thermal image correction circuitry configured to correct an image generated by the thermal image generator by using the plurality of correction coefficients, wherein the infrared imaging program is for causing the computing device to function to cause the correction coefficient calculation circuitry to calculate the plurality of correction coefficients on a basis of difference between pixel values of pixels arranged in a direction in which the streak noise occurs in the single thermal image, wherein the infrared imaging program further causes the computing device to function as:

smoothing processing circuitry configured to perform a smoothing process on the pixel values of the pixels arranged in the direction in which the streak noise occurs, by using pixel values of pixels adjacent to the pixels arranged in the direction in which the streak noise occurs in a direction crossing the direction in which the streak noise occurs, and calculate, as the target values, smoothed pixel values that are pixel values after smoothing; and a sorter to sort the pixel values of the pixels arranged in the direction in which the streak noise occurs in descending or ascending order, and sort the smoothed pixel values in descending or ascending order, wherein the correction coefficient calculation circuitry approximates coordinates represented by the pixel values of the pixels arranged in the direction in which the streak noise occurs and ordinal positions thereof, with a polynomial function, approximates coordinates represented by the smoothed pixel values and ordinal positions thereof, with a polynomial function, and calculates the plurality of correction coefficients of the correction equation by using coefficients of each polynomial function.

13. A non-transitory computer-readable storage medium storing an infrared imaging program for causing a computing device to function as:

a thermal image generator to generate a single thermal image on a basis of a signal output from a thermal image sensor;

correction coefficient calculation circuitry configured to calculate a plurality of correction coefficients included in a correction equation for converting pixel values of pixels included in the single thermal image into target values in which streak noise extending from one end to another end of the single thermal image is reduced; and thermal image correction circuitry configured to correct an image generated by the thermal image generator by using the plurality of correction coefficients, wherein the infrared imaging program is for causing the computing device to function to cause the correction coefficient calculation circuitry to calculate the plurality of correction coefficients on a basis of difference between pixel values of pixels arranged in a direction in which the streak noise occurs in the single thermal image, wherein the infrared imaging program further causes the computing device to function as a sorter to sort pixel values of pixels included in a pixel row that is a set of the pixels arranged in the direction in which the streak noise occurs in the single thermal image, in descending or ascending order, and sort pixel values of pixels included in a pixel row adjacent in a direction crossing the direction in which the streak noise occurs, in descending or ascending order, wherein the correction coefficient calculation circuitry:

approximates coordinates represented by the pixel values of the pixels arranged in the direction in which the streak noise occurs and ordinal positions thereof, with a polynomial function, and calculates coefficients of the polynomial function, approximates coordinates represented by the pixel values of the pixels included in the adjacent pixel row and ordinal positions thereof, with a polynomial function, and calculates coefficients of the polynomial function, calculates average coefficients that are average values of the coefficients calculated on a basis of the pixel values of the pixels arranged in the direction in which the streak noise occurs and the coefficients calculated on a basis of the pixel values of the pixels included in the adjacent pixel row, and calculates the plurality of correction coefficients of the correction equation by using the coefficients calculated on a basis of the pixel values of the pixels having different pixel values and the average coefficients.

14. A non-transitory computer-readable storage medium storing an infrared imaging program for causing a computing device to function as:

a thermal image generator to generate a single thermal image on a basis of a signal output from a thermal image sensor;

correction coefficient calculation circuitry configured to calculate a plurality of correction coefficients included in a correction equation for converting pixel values of pixels included in the single thermal image into target values in which streak noise extending from one end to another end of the single thermal image is reduced; and thermal image correction circuitry configured to correct an image generated by the thermal image generator by using the plurality of correction coefficients, wherein:

the infrared imaging program is for causing the computing device to function to cause the correction coefficient calculation circuitry to calculate the plurality of correction coefficients on a basis of difference between pixel values of pixels arranged in a direction in which the streak noise occurs in the single thermal image, the pixels arranged in the direction in which the streak noise occurs include three or more pixels having different pixel values, and the correction coefficient calculation circuitry calculates the plurality of correction coefficients without using a largest or smallest pixel value of the three or more different pixel values.

* * * * *